Oct. 9, 1956     O. L. HIBBARD ET AL     2,765,602

CARD COUNTING AND PACKAGING MACHINE

Filed Jan. 18, 1955     15 Sheets-Sheet 1

INVENTORS
FRED M. CARROLL
OSCAR L. HIBBARD
BY
Davis, Hope & Faithfull
ATTORNEYS

INVENTORS
FRED M. CARROLL
OSCAR L. HIBBARD
BY
ATTORNEYS

Oct. 9, 1956  O. L. HIBBARD ET AL  2,765,602
CARD COUNTING AND PACKAGING MACHINE
Filed Jan. 18, 1955  15 Sheets-Sheet 6
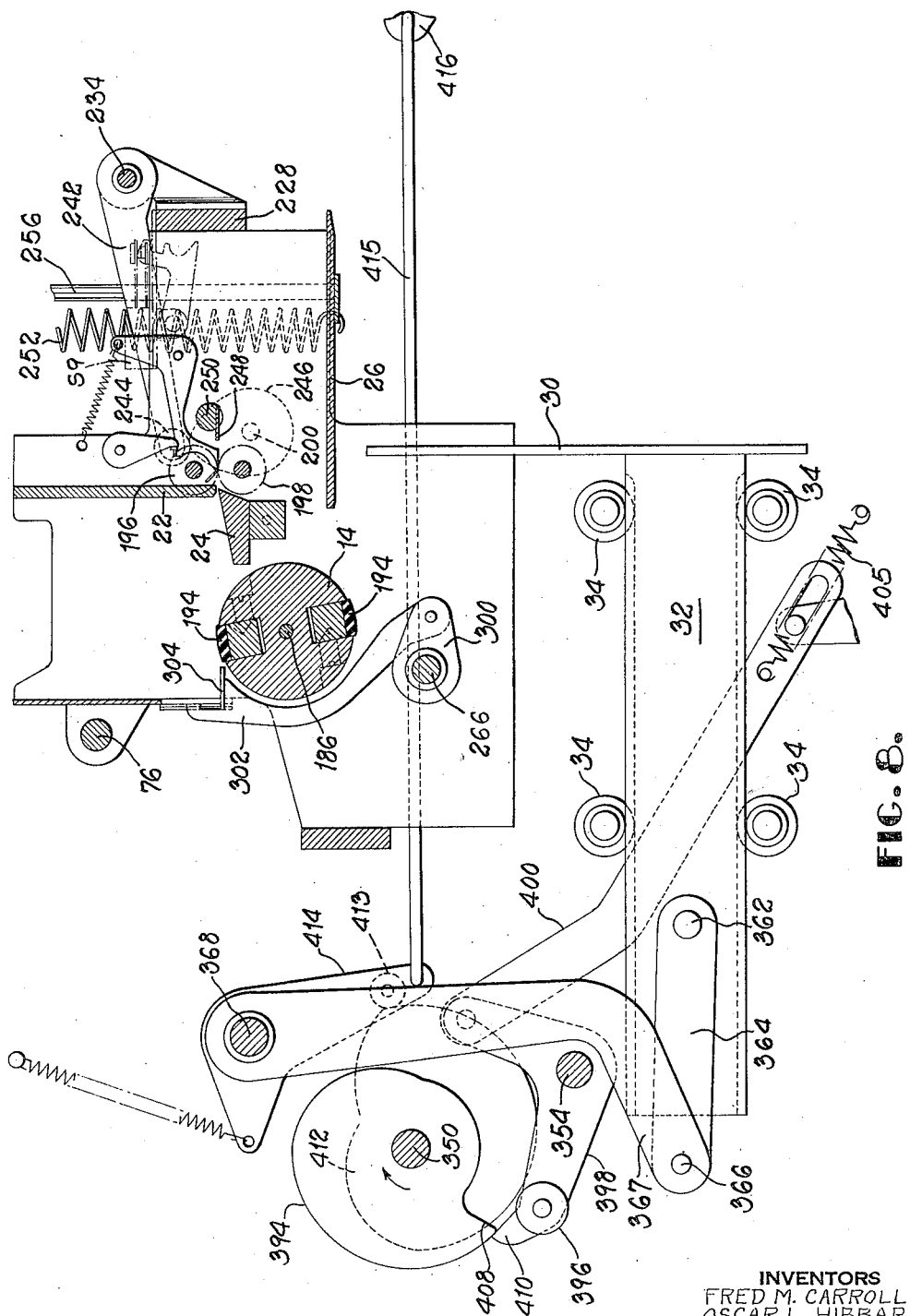
INVENTORS
FRED M. CARROLL
OSCAR L. HIBBARD
BY
Davis, Hoxie & Faithfull
ATTORNEYS Oct. 9, 1956　　　O. L. HIBBARD ET AL　　　2,765,602
CARD COUNTING AND PACKAGING MACHINE
Filed Jan. 18, 1955.　　　　　　　　　　　　15 Sheets-Sheet 7

Inventors
FRED M. CARROLL
OSCAR L. HIBBARD
BY
Davis, Hoxie & Faithfull
Attorneys Oct. 9, 1956     O. L. HIBBARD ET AL     2,765,602
CARD COUNTING AND PACKAGING MACHINE
Filed Jan. 18, 1955                        15 Sheets-Sheet 8
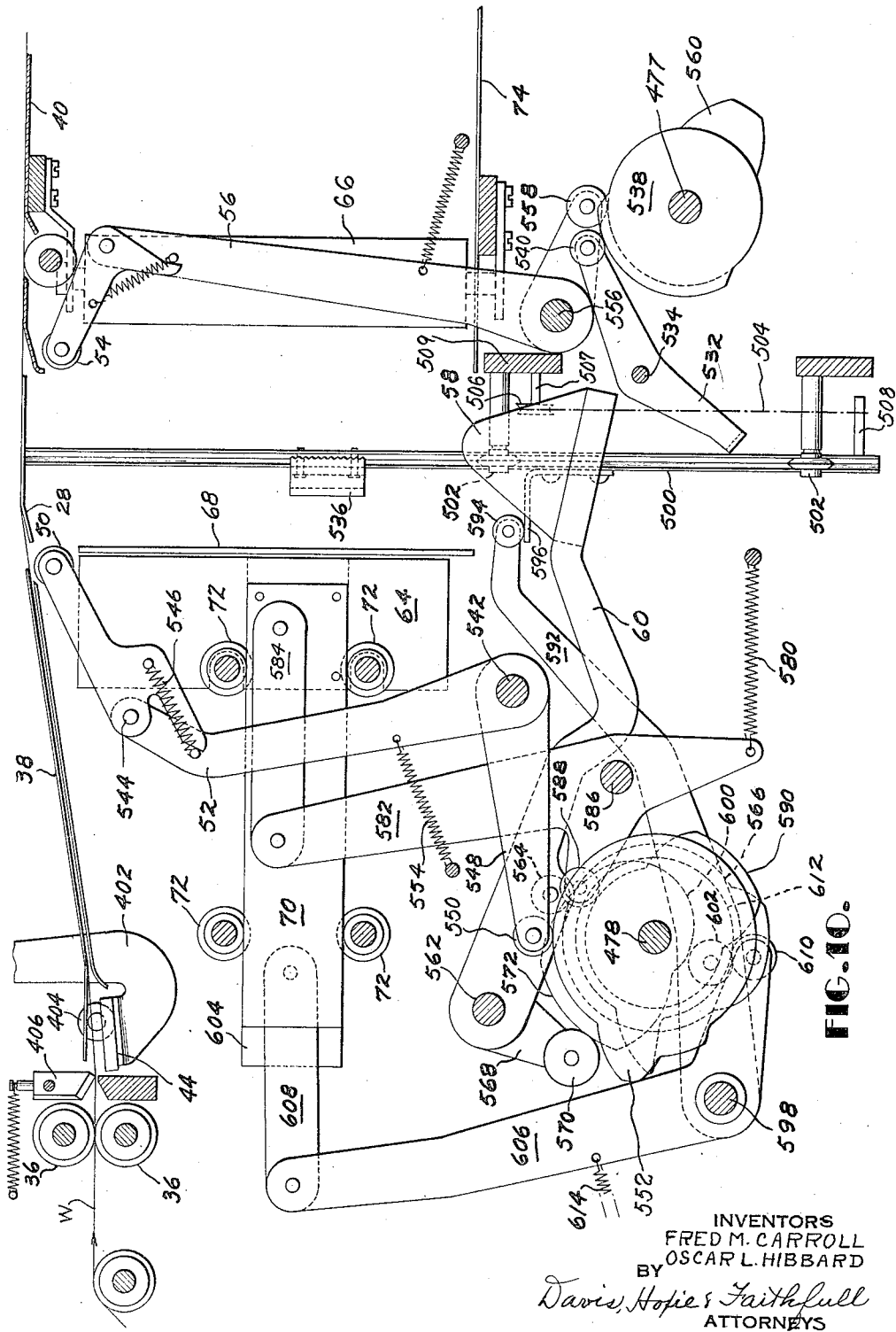
INVENTORS
FRED M. CARROLL
OSCAR L. HIBBARD
BY
Davis, Hoxie & Faithfull
ATTORNEYS

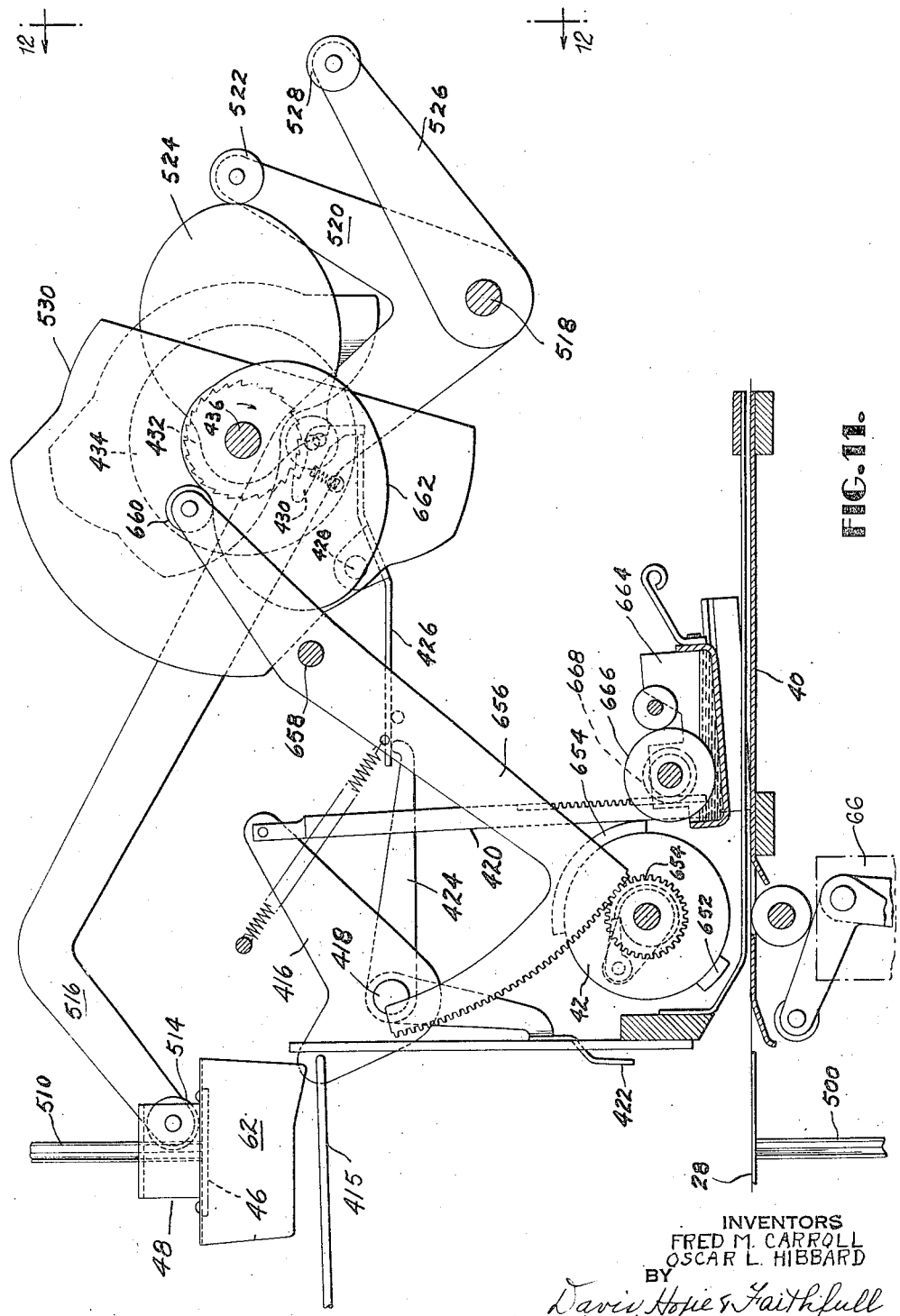

INVENTORS
FRED M. CARROLL
OSCAR L. HIBBARD

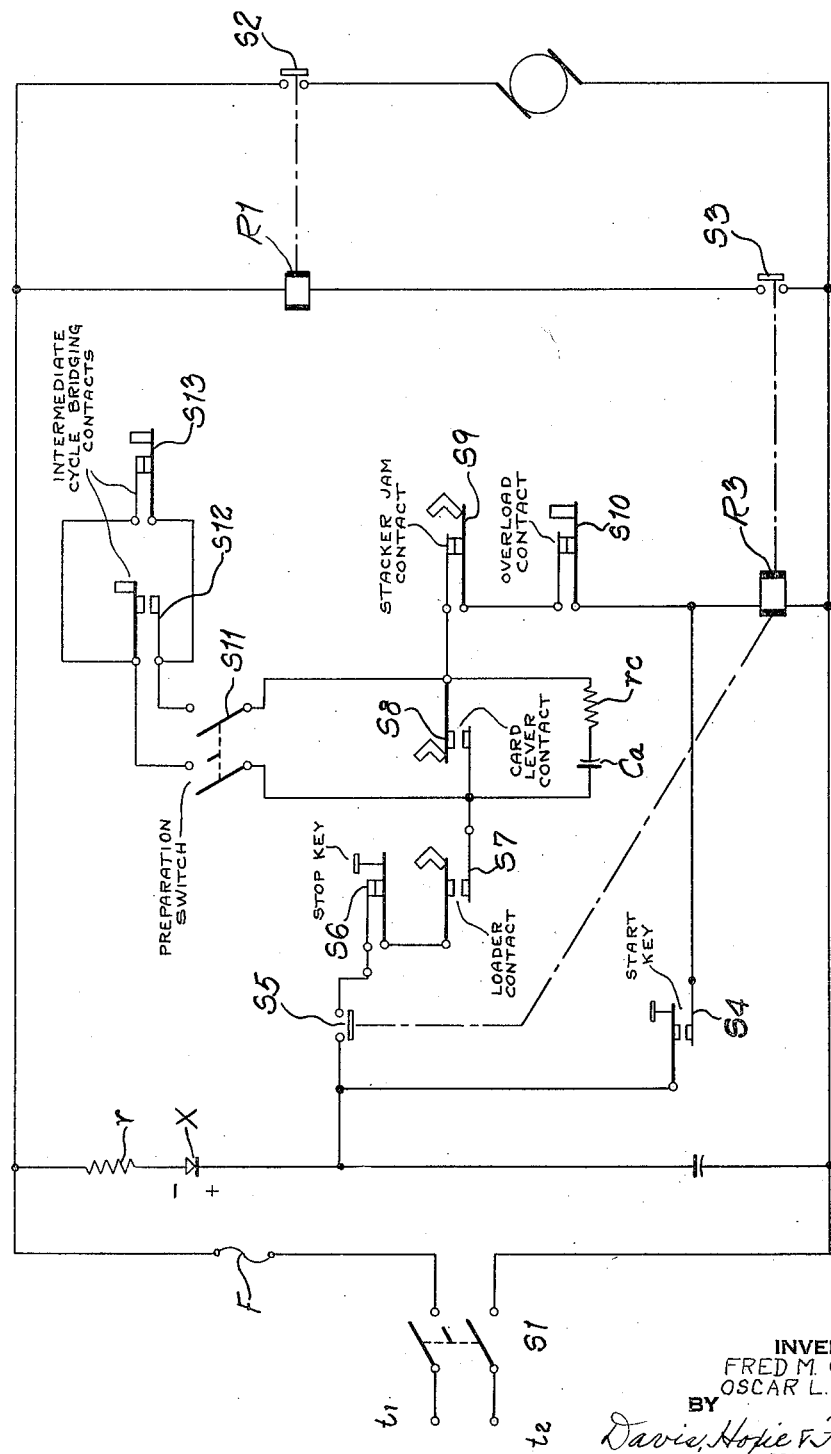

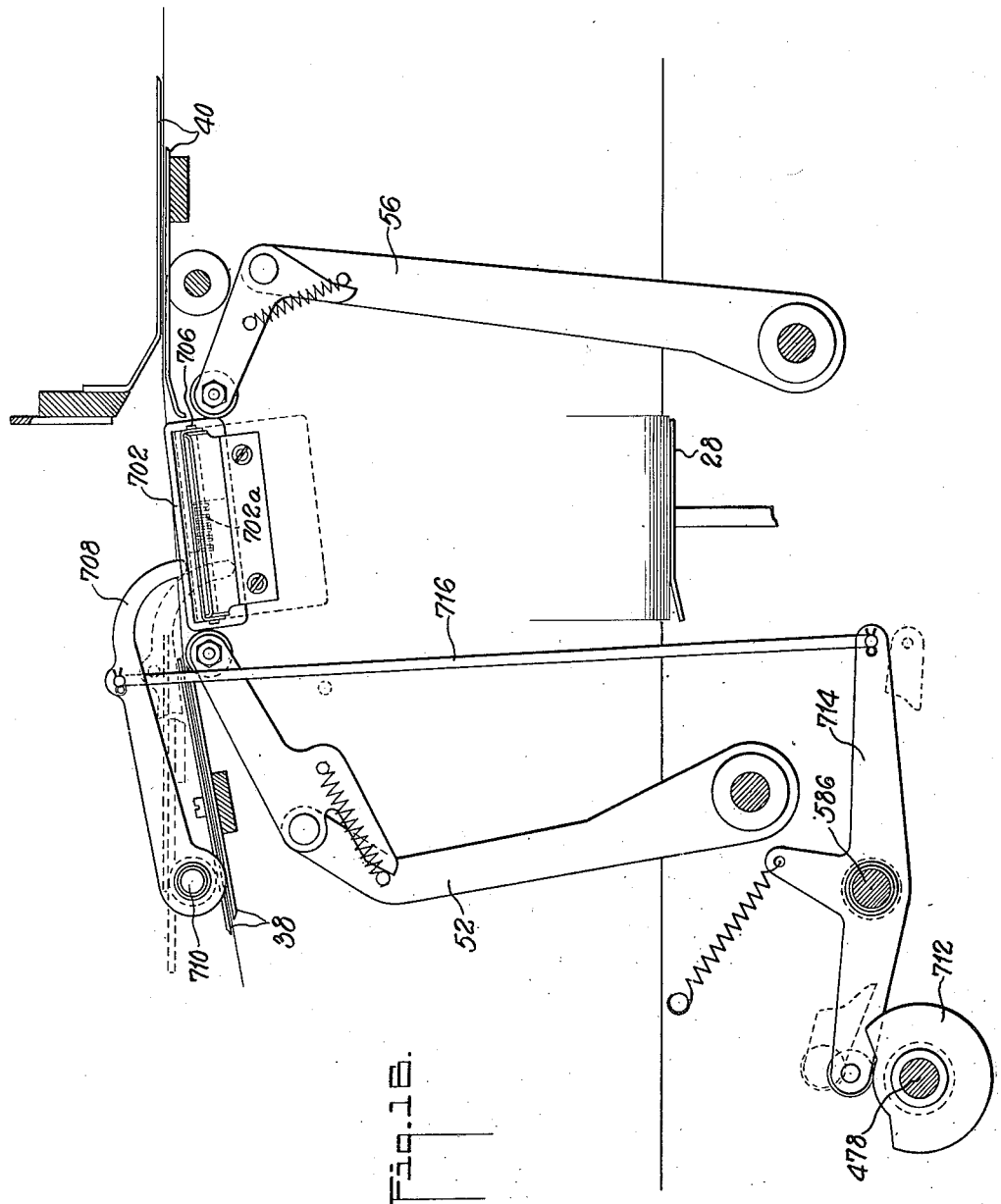

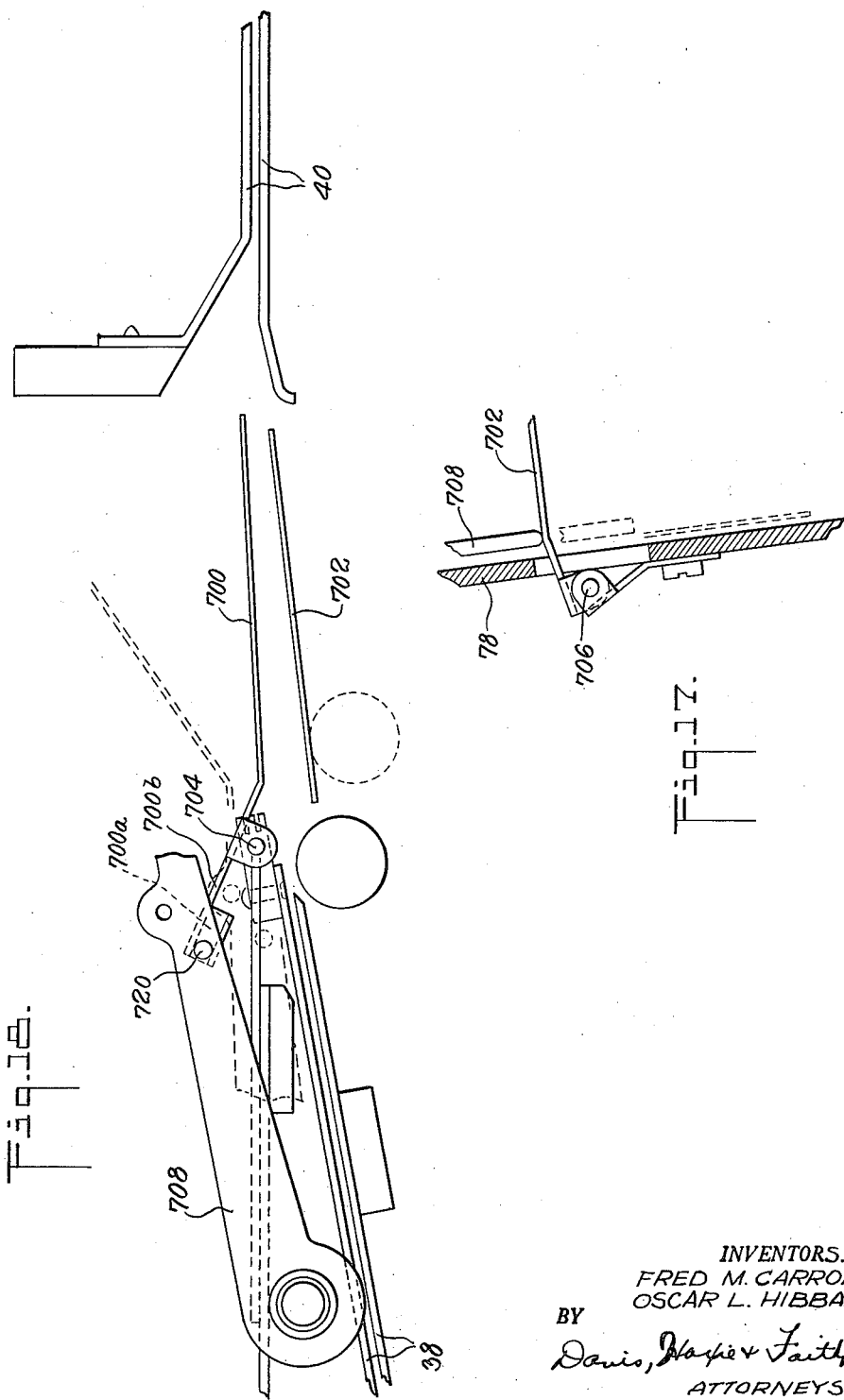

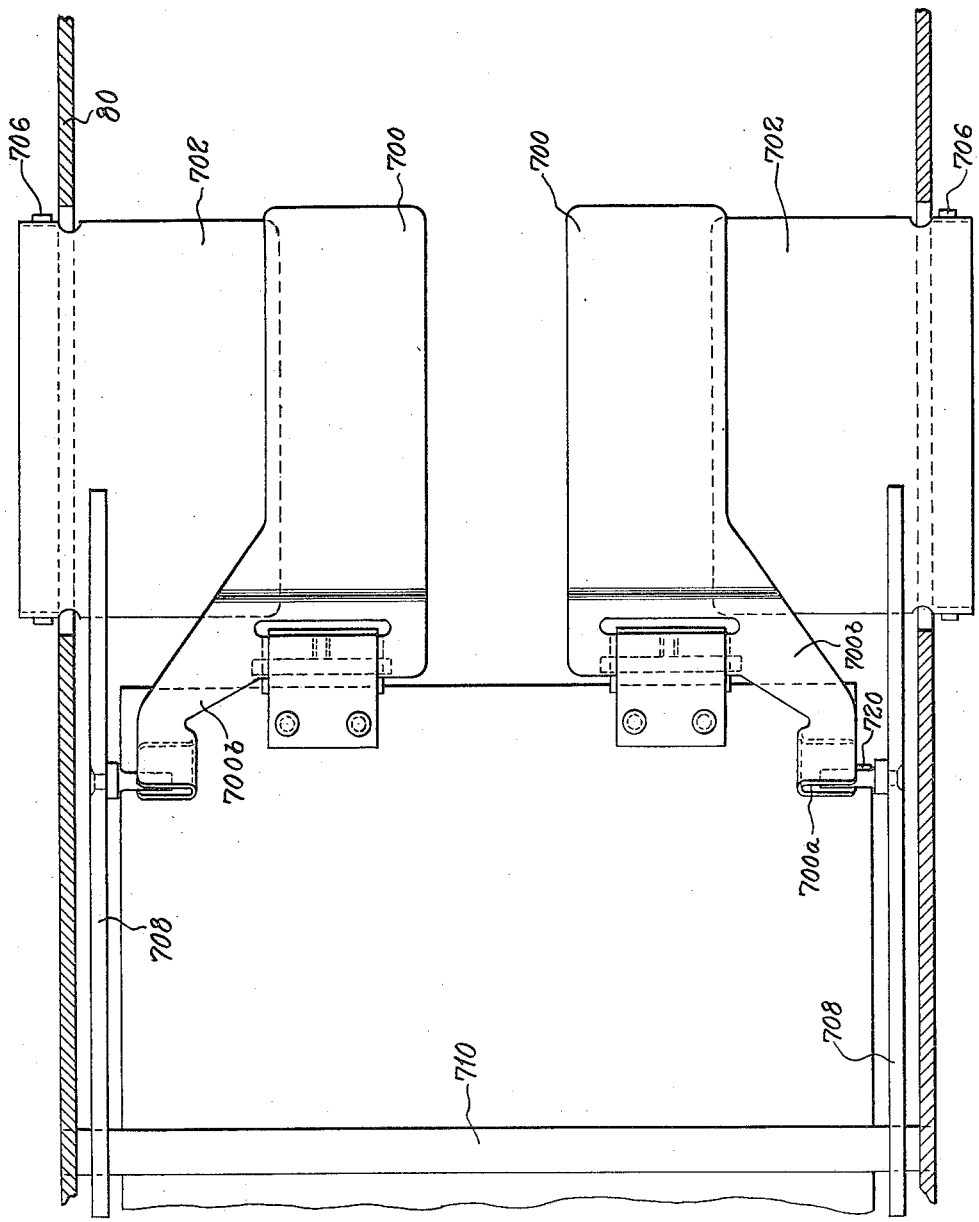

United States Patent Office 2,765,602
Patented Oct. 9, 1956

2,765,602

CARD COUNTING AND PACKAGING MACHINE

Oscar L. Hibbard, Johnson City, and Fred M. Carroll, Binghamton, N. Y., assignors to International Business Machines Corporation, New York, N. Y., a corporation of New York Application January 18, 1955, Serial No. 482,572

23 Claims. (Cl. 53—61)

This invention relates to packaging apparatus and more particularly to apparatus which counts and packages a predetermined number of relatively thin articles, such as cards.

Objects of this invention are to provide apparatus which will count and stack a predetermined number of cards, which wraps the counted cards in bundles, which is completely automatic and rapid in operation, which performs the wrapping operation on one bundle as the cards for the following bundle are being counted, and which advances the packaging art generally.

Apparatus for counting and wrapping cards according to the present invention comprises a hopper which is manually or otherwise loaded with unwrapped cards. The hopper has associated therewith means for periodically feeding selected numbers of cards to feeding and counting means such as a rotating drum by means of which the cards are ejected one by one and arranged in a stack on a platform which descends as the cards accumulate. After the stack includes the predetermined number of cards, the stack is transferred longitudinally so that its bottommost card rests upon the top of a web of wrapping material. The transferred stack and wrapping material are supported upon a platform or elevator which descends as the stack is forced downwardly by the engagement of the top of the stack by a ram so that the web is brought up along two opposed sides of the stack. The ram is then partially withdrawn and the ends of the web lapped over the top of the stack by folding means such as cam operated rollers to form a tube of wrapping which encloses the stack. The open ends of the tube adjacent the card ends are tucked in to complete the wrapping by further folding means such as two spaced lower folding members which are conjointly moved upwardly by the cam means to fold inwardly against the opposed ends of the stack the bottom portion of the tubed web which extend beyond the end edges of the stack. The top portions of the tubed web that extend beyond the stack ends are folded against the stack ends by somewhat similarly shaped upper folding members which are preferably, but not necessarily, carried by the ram. One pair of the flaps formed by the side portions of the web which extends beyond the stack ends after the web top and bottom portions have been folded against the stack ends, is folded against such top and bottom portions by two spaced side folding members. The second pair of flaps is folded against the first pair by two spaced rolls between which the wrapped stack is slightly compressed as it is moved from the position wherein the folding operations take place. Means are preferably provided for applying an adhesive to the leading and side edges of the web so that the side flaps are maintained in their folded positions.

These and other objects and aspects of the invention will be apparent from the following description of a specific embodiment of the invention which refers to drawings wherein:

Fig. 7 is a fragmentary view showing the hopper mechanism gear train drive;

Fig. 8 is a section on line 8—8 of Fig. 3;

Fig. 9 is a section on line 9—9 of Fig. 3;

Fig. 10 is a side elevational view of the wrapping mechanism and elevator;

Fig. 11 is a side elevational view of the ram operating mechanism;

Fig. 15 is the electrical wiring diagram;

Fig. 16 is a side elevational view, partly in section, of the folding guide mechanism for bridging the gap at the wrapping platform position;

Fig. 17 is a detail front view of the lower bridging guides,

Fig. 18 is a detail view similar to Fig. 16 but taken at a different section to show other parts of the following guide mechanism, and Fig. 19 is a plan view of the folding guide mechanism.

Figure 1:
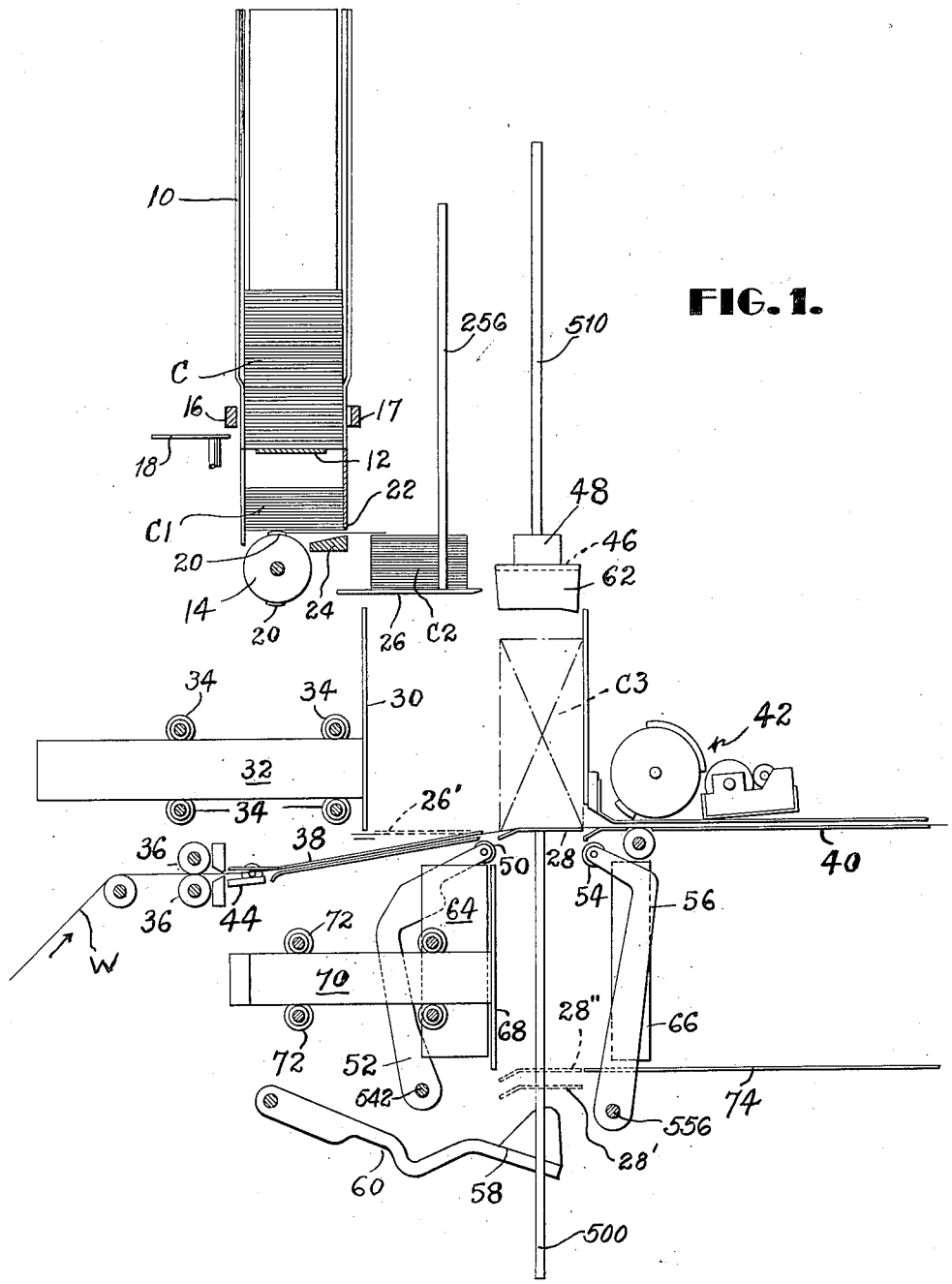
Fig. 1 is a schematic view showing the operation of the various elements of the machine.

The particular apparatus chosen for the purposes of illustration is a machine which is best adapted to the counting and wrapping of cards, such as are used in business machines, in bundles of one thousand although it is to be understood that the invention is not so limited and the principles herein described are applicable to the enumerating and packaging of other relatively thin articles of a variety of different sheet materials. In order that the sequence of operations of the machine can be more readily visualized, they will first be described generally with reference to Fig. 1 which diagrammatically illustrates the relative positions of the more important elements of the machine.

The cards C, which are standard business machine cards 7⅜ inches long and 3¼ inches wide, are manually stacked in the hopper 10 so that the opposite ends of the bottommost card of the stack rest upon two spaced sets of fingers, one set of which is shown at 12. The fingers are pivotally retractable to drop a predetermined number of the bottommost cards into the lower end of the hopper 10, as at C1, with the bottom card resting upon a feeding drum 14 which ejects the cards one by one as described below. When the top of the stack drops below a predetermined position, a feeler (not shown) initiates the feeding cycle during which fingers 12 are operated. The feed cycle is such that the number of cards dropped by the retraction of the fingers 12 is limited to approximately fifty by two clamping members 16 and 17, one of which is movable inwardly so that the members engage the opposed sides of the stacked cards prior to the operation of the fingers. After the clamping members 16 and 17 are in their gripping position, the fingers 12 are pivoted downwardly to a partially retracted position so that the cards in the lower stack below the clamping members are separated by a short distance from the upper stack of cards held by the clamping members. After this separation of the upper and lower stacks of cards has taken place, a shutter 18 is pivotally moved into the space between the stacks so as to interpose a barrier therebetween which provides a positive mechanical separation of the stacks. The fingers 12 are then further pivoted so that they are fully retracted to drop the lower stack to the bottom of the hopper 10 as shown at C1.

In this position the undersurface of the bottommost card of the lower stack C1 is contacted by one of the diametrically opposed friction pads 20 which project from the periphery of the drum 14 so as the drum is rotated the bottommost card is ejected between the throat knife 22 and throat block 24. As the drum 14 revolves succeeding cards of the lower stack drop down and are ejected in a similar manner to form a stack C2 on a spring supported elevator platform 26 which descends under the weight imposed thereupon by the cards to maintain the level of the top of the stack below that of the aperture from which the cards are ejected. Interconnected with the drum 14 is a counting system (not shown) having a feeler which is interposed in the path of the cards emerging from the throat knife 22 and throat block 24 so as to determine the number of cards ejected from the bottom of the hopper 10. After a predetermined number of cards, e. g., one thousand, have been enumerated by the counting system, the ejecting of the cards by the drum 14 is stopped by lifting the stack of cards CI away from the drum rather than stopping the drum's rotation. The weight of a full stack of cards C2 is sufficient to lower the platform 26 to the position designated 26' whereupon the stack is transferred to the right in a horizontal direction to rest upon a second elevator platform 28, as at C3, by means of cam operated pusher members 30 carried at the end of support bars 32 which are movably interposed between V-wheels 34. When the weight of the cards is removed, the first platform 26 ascends to its original elevated position and the counting is resumed for the following bundle.

Prior to the above described horizontal transfer of the card stack C3, the leading edge of a web W of a sheet material such as wrapping paper is fed by power driven rolls 36 through guides 38 and 40 so that the web W lies across the second elevator platform 28. During the feeding of the web W an adhesive roll 42 applies glue or other suitable adhesive to areas at the leading edge and near either side edge of the web. After a sufficient length of web W has been fed to wrap a full stack of cards, the web is severed by a knife 44. The web W is moved into position to lie over the elevator platform 28 before the stack C3 is transferred to the platform, as described above, so that the web is interposed between the paper and the platform at the beginning of the wrapping operation.

The first step in the wrapping operation is to enclose the stack C3 in an open ended rectangular tube formed of the web W, the axis of the tube being disposed horizontally so that its open ends correspond with the ends of the stacked cards. The second and third steps cause to be folded in against the ends of the stack the top and bottom portions of the tube which extend beyond the stack ends leaving two vertically disposed flaps at either end which lie in the planes of the respective sides of the stack. The third and fourth steps consist of folding the flaps inwardly against the inwardly folded top and bottom portions of the web to complete the wrapping.

The stack enclosing tube is formed by forcibly bringing the head 46 of a cam operated ram 48 into contact with the top of the stack C3 so that the stack and platform are lowered to the position causing the web W to be brought down along the sides of the stack. The ram 48 is then partially retracted permitting the platform 28 to rise to position 28" where it is restrained by a latch (not shown) so that slack is provided in the web to make an overlap at the top of the stack. The trailing end of the web severed as described above (i. e., the end on the left hand as seen in Fig. 1) is first folded down against the top of the stack by means of a first tube roller 50 which is carried upon the upper ends of two spaced pivotally mounted arms 52 so that the roller can be arcuately moved to bring the web end down upon the top of the stack. As the tube roller 50 is being retracted after folding the left hand end of the web, a second tube roller 54 carried upon the ends of two pivotally mounted arms 56 folds the leading (right hand) end of the web inwardly across the top of the stack in a similar manner so that the right hand end of the web overlaps the left hand end. The right hand web end is the leading end whereupon the adhesive has been applied as described above, so that the web ends are secured in place by the adhesive to form an open ended tube of wrapping material about the stack of cards. As the width of the web is made materially greater than the length of the cards, the tube extends beyond both ends of the stack.

Four separate operations are required to close the ends of the tube by tucking in the extending portions of the web so as to complete the package, the corresponding operations being performed simultaneously upon the opposite ends of the stack. For the purpose of illustration only and as an aid in the description of the various folding steps, the term "end" will be used to define the shorter edge of the cards in the stack and the term "side" the longer edge, it being understood that these terms are not to be construed as limiting the invention and that it is possible to proportion the various machine elements so that the operations described hereinafter as being performed on the sides and ends, respectively, could conversely be performed instead upon the ends and sides without departing from the spirit of the invention.

The following operations will be described in connection with the closing of only one open end of the tube of wrapping material about the card stack, it being understood that each of the machine elements required to carry out the operations on one end has a corresponding element spaced therefrom and operated conjointly therewith to carry out simultaneously the corresponding operations upon the other open end of the tube. The first operation is performed by means of a bottom folding member 58 consisting of a rectangular plate with rounded corners which is mounted at the end of a pivoted arm 60 so that the plate can be moved upwardly parallel to the end of the card stack at a small distance therefrom so as to fold the bottom portion of the web forming the tube, which extends out beyond the bottom of the end of the stack, upwardly against the stack end. The top portion of the web forming the tube which extends out beyond the top of the end of the stack, is folded down against the stack end in a similar manner by an upper folding member 62 which, rather than being carried by a separate arm, is attached to project downwardly from the ram head 46 so that the top end portion of the web is folded by a second stroke of the ram 48 (the first stroke being required to lower the second platform 28 as described heretofore).

When the top and bottom end portions of the tube are folded in against the stack ends as described above, the web material adjacent the corners at which the end portions join the side portions of the tube are folded upon a bias into planes coinciding with the planes of the sides of the stack so as to form, in combination with the portions of the tube which extend out endwise beyond the sides of the stack, two opposed flaps. The folders 58—62 remain in position to hold folds until member 64 takes over. The left hand flap is folded inwardly by a side folding member 64 which is supported by bars free to move in V rolls. Member 64 is moved in a horizontal direction from left to right by means of a cam operated arm (not shown in Fig. 1) so as to bring the folding member parallel to and spaced a short distance from the stack end. This movement folds the left-hand flap inwardly towards the end of the stack to bring the flap against the top and bottom web portions which have been previously folded in as described above. The fold members 64 remain in the position moved to the right and support the flaps while the right hand flap is turned inwardly by passing the otherwise completely wrapped stack between two vertical folding rollers 66 by means of two spaced pushers 68 which engage the left hand side of stack near the ends thereof. The pushers 68 are actuated by means of a supporting bar 70 which is carried on V-wheels 72 so that movement of the pushers from left to right transfers the wrapped stack from the second platform onto a stationary eject platform 74. During this movement the adjacent roller 66 engages the right-hand flap to force the flap inwardly against the previously folded left hand flap. As mentioned heretofore, adhesive has been applied by the roll 42 to areas near the sides of the web which areas are located so that the adhesive is positioned upon the inner surfaces of the right hand flaps after they have been folded inwardly by the rollers 66. The movement of the pushers 68 is limited so that after the completion of their stroke the wrapped stack is still between the rollers 66, the stack remaining in this position to permit the adhesive to set while the next succeeding stack is being wrapped. The wrapped stack is ejected from between the rollers 66 by the succeeding stack only as the succeeding stack is transferred from the platform 28 by the pushers 68 to complete the operation of the machine. The various elements and the cooperation therebetween required to carry out the above wrapping operations will now be described in detail.

*Loading hopper*

To permit a convenient access to the card feed, the hopper 10 and all of its associated mechanism and operating linkages are pivotally mounted upon a transverse shaft 76 (Fig. 4) whose ends are journalled respectively in bearings carried by the side plates 78 and 80 forming the main frame of the machine. Pivotally mounted upon the shaft 76 are two spaced brackets 82 which carry two transverse plate members 84. Extending vertically upwardly from the transverse members are two sheet metal strips which form the side members 86 of the magazine portion of the hopper, the spacing between the members being somewhat greater than the width of a card. One end of the magazine is closed by a narrower end strip 88, the other opposed front end being left open to facilitate the manual loading of the magazine.

Figure 4:
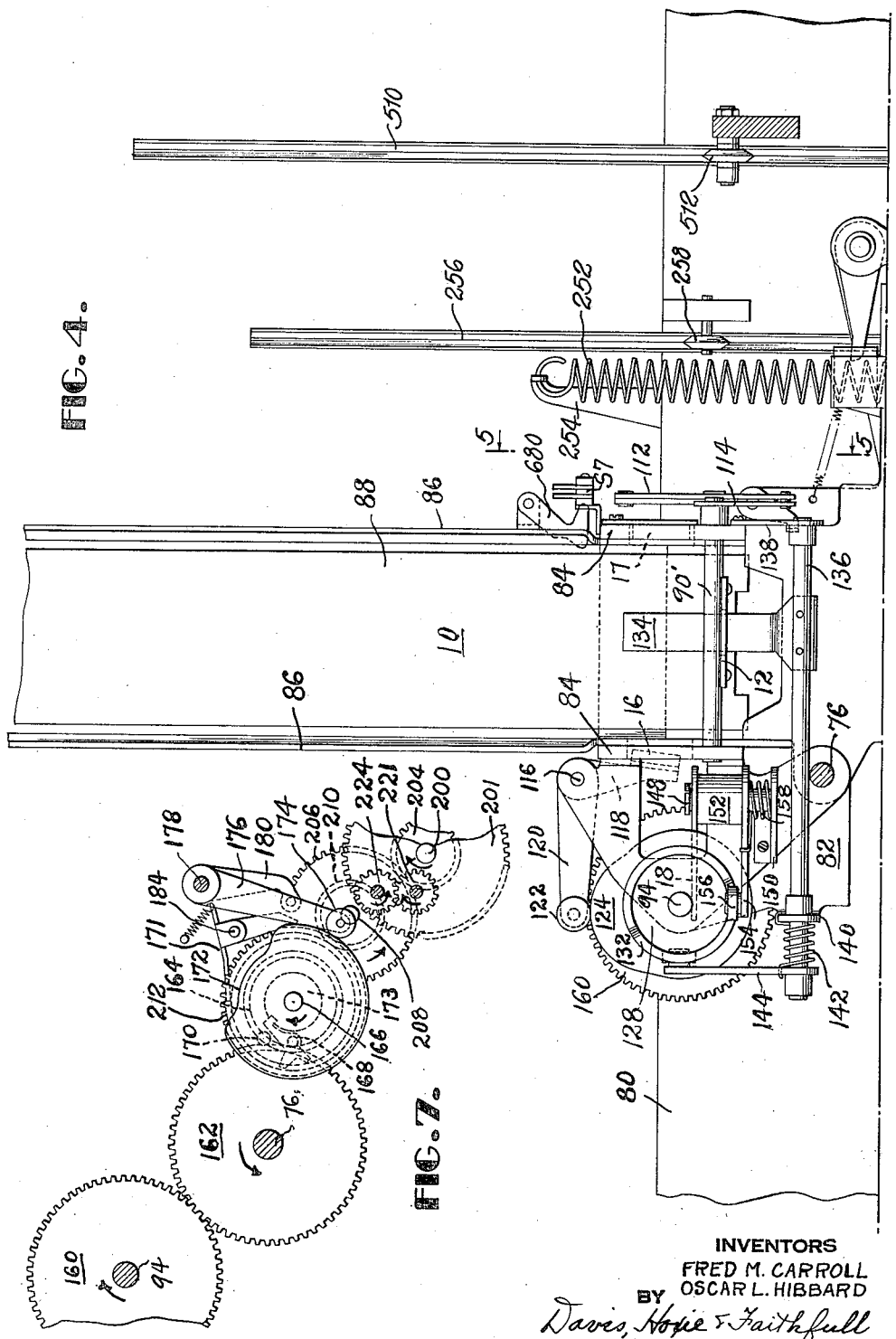
Fig. 4 is a front elevational view of the hopper.
Figure 5:
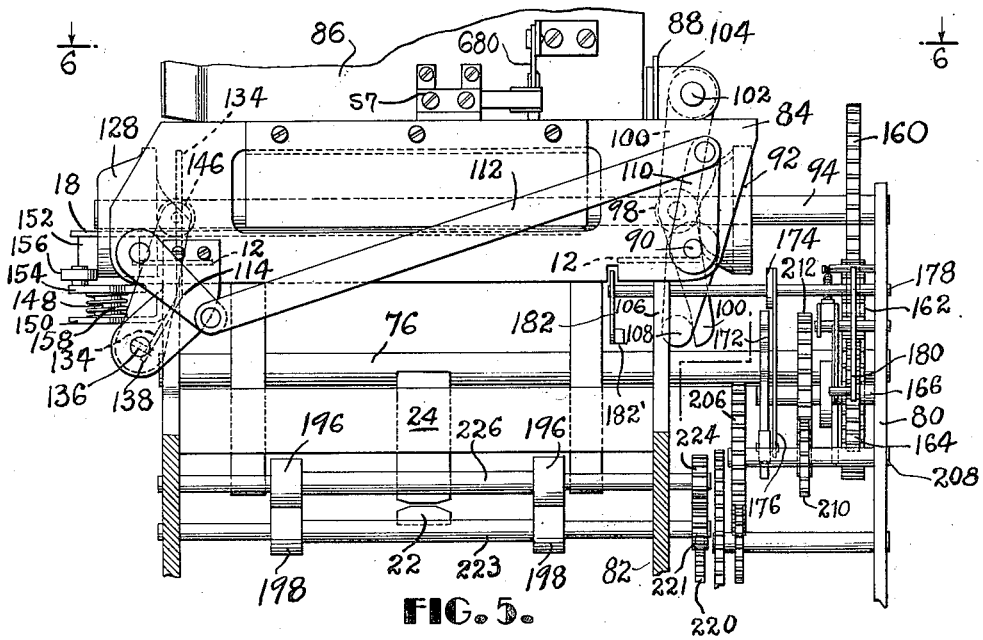
Fig. 5 is a side elevational view of the hopper.
Figure 6:
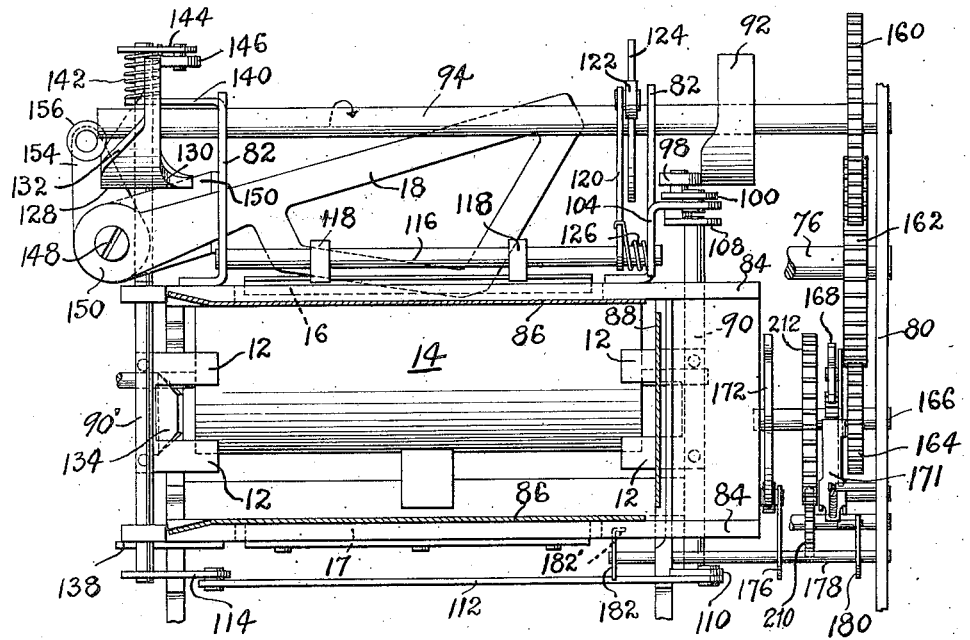
Fig. 6 is a section taken on line 6—6 of Fig. 5.
Figure 6:
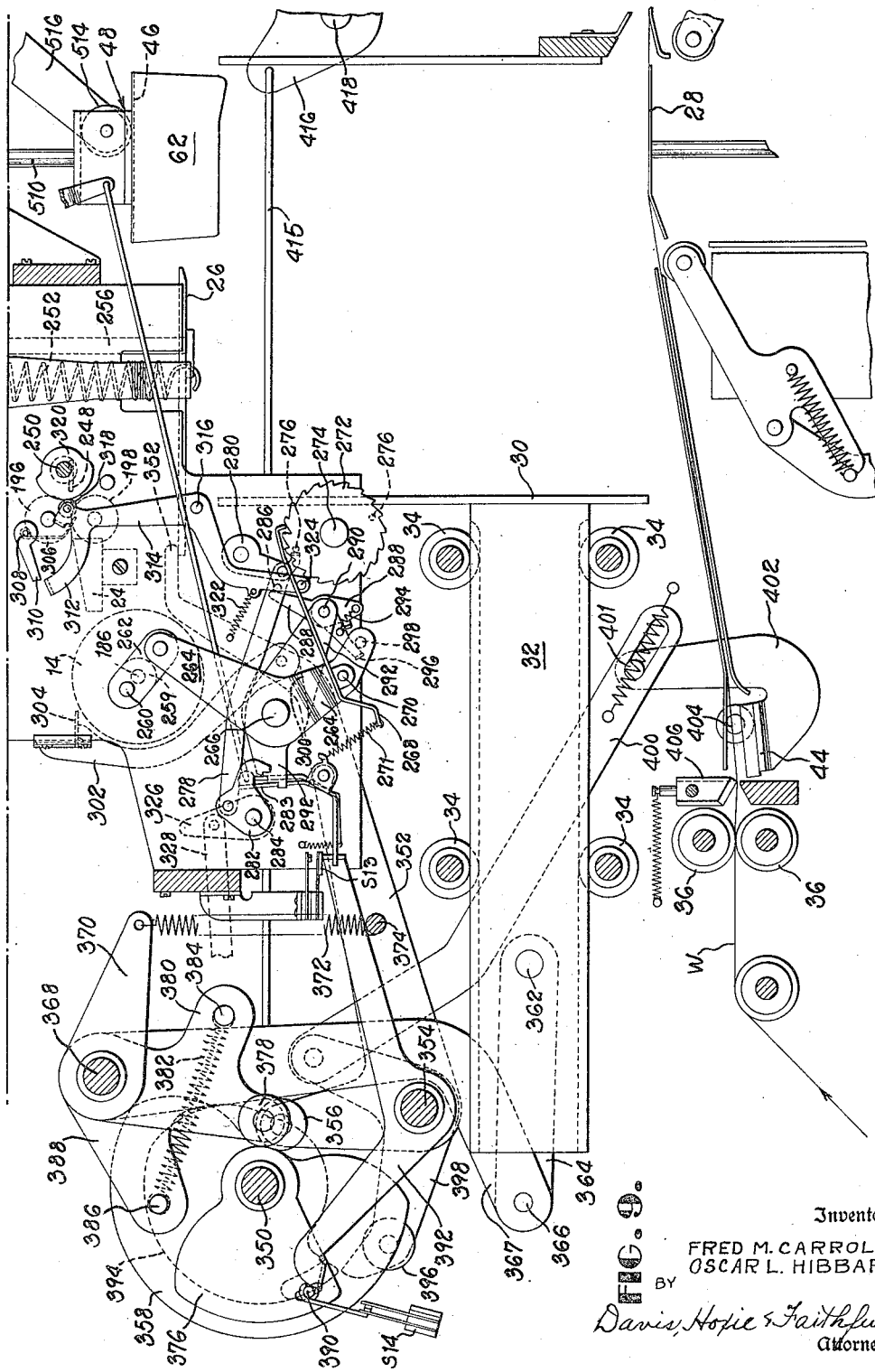

As mentioned heretofore, the cards placed in the magazine are restrained from falling out through the bottom by fingers 12. As is best shown in Figs. 4, 5 and 6, the fingers 12 are arranged in two pairs located respectively so as to extend inwardly from either end of the magazine near the bottom thereof. The right hand pair of fingers 12 is attached to a shaft 90 which is journalled in the transverse plate members 84 so that the fingers 12 are pivotally retracted downwardly by the rotation of the shaft 90 in a counterclockwise direction as viewed in Fig. 5. This rotating movement of the shaft 90 is obtained from the action of a barrel cam 92 which is attached to a shaft 94 whose ends are journalled in the right hand hopper bracket 82' and the left hand hopper bracket 82. The cam motion is transmitted from the cam 92 to a cam follower, such as the roller 98, rotatably mounted at an intermediate point of a bent lever 100 one end of which is pivotally attached as at 102 to ear 104 of the right hand hopper bracket 82'. The other end of the lever 100 engages a pin 106 carried upon the end of an arm 108 which is attached to the rear end of the shaft 90 so that when the cam roller 98 engages the raised portions of the cam surface of the cam 92, the shaft 90 is maintained in the position shown to hold the fingers 12 in the horizontal position. When the cam 92 is rotated so that the roller 98 engages the lower portions of its surface, the lever 100 moves to the right permitting the shaft 90 to rotate in a counterclockwise direction thus lowering the fingers 12. At the opposite end of the shaft 90 is attached one end of a second arm 110 positioned at 180° from the first arm 108. The opposite end of the arm 110 is pivotally connected to one end of a link 112 whose other end is similarly connected to the end of an arm 114. The opposite end of the arm 114 is attached to the forward end of a shaft 90' carrying the left hand pair of fingers 12 so that the shaft is rotated clockwise to lower these fingers simultaneously with the corresponding movement of the right hand pair of fingers.

The movable card clamping member 16, which cooperates with the fingers 12 as described above, is attached by means of two spaced arms 118 to a shaft 116 whose ends are journalled in the hopper brackets 82. Also attached to the shaft 116 is an arm 120 upon whose end is rotatably carried a cam follower roller 122 which engages the effective surface of a cam 124. The cam is attached to cam shaft 94 so that rotation of the shaft, as described in detail below, brings the roller 122 into engagement with the lower portion of the cam surface to permit a spring 126 to move the clamping member 16 inwardly into contact with the sides of the cards stacked in the hopper magazine. Cooperating with the movable clamping member 16 to restrain the cards from dropping to the bottom of the magazine is a fixed clamping member 17 which is attached to the front transverse member 84 opposite the movable clamping member.

The cam shaft 94 also carries a second barrel cam 128 which has two independent cammed surfaces 130 and 132 upon its respective ends. The first cammed surface 130 controls the operation of a joggle arm 134 (Fig. 4) whose function is to make certain that the cards dropped by the partial retraction of the fingers 12 are in the proper stacked position wherein they bear against the end wall 88 and do not clog the magazine. The joggle arm 134 is attached to a shaft 136 and is bent upwardly so as to pass substantially vertically up between the left hand pair of fingers 12. The ends of the shaft 136 are journalled respectively in a bracket 138 which projects downwardly from the front transverse member 84 and an extension 140 from the left hand bracket 82. The joggle arm 134 is biased in its illustrated vertical position by a helical torsion spring 142, one end of which bears against the bracket extension 140 and whose other end contacts an arm 144 attached to the outboard end of the shaft 136. The end of the arm 144 carries a cam follower roller 146 which engages the cammed surface 130 of the barrel cam 128 so that as the cam shaft 94 is rotated, the joggle arm 134 is moved inwardly against the biasing force of the spring 142 to contact the outer ends of the cards in the magazine thus moving the cards against the magazine end wall 88.

The second cammed surface 132 of the barrel cam 128 operates the shutter 18 which acts as a separating barrier between the upper and lower stacks of cards during the downward retraction of the fingers 12. As is best seen in Figs. 4 and 6, the shutter 18 is generally triangular in shape and is carried upon the end of an integral arm which is pivotally mounted upon a pin 148 which projects upwardly from an extension 150 from the bracket 82. The shutter arm is secured to the upper end of a hub for spacer 152 which surrounds the pivot pin 148. A cam follower arm 154 is secured to the lower end of the spacer 152 and carries upon its end a roller 156 which engages the second cammed surface 132 of the barrel cam 128. The cammed surface 132 is of such a configuration as normally to restrain the shutter 18 in the retracted position shown against the force exerted by a helical spring 158 the ends of which engage the extension 150, and the cam follower arm 154, respectively. As the cam shaft 94 is rotated, the lower portions of the cammed surface permit the spring 158 to swing the shutter 18 clockwise as viewed in Fig. 6 into the magazine to separate the upper and lower stacks of cards.

The timing of the cams 92, 124 and 128 is such that as the cam shaft 94 is rotated by a gear train, described in detail below, the first operation to take place is the inward movement of the clamping member 16 by the cam 124, which takes place between the 22° and 45° positions of the cam shaft, to clamp the opposite sides of the adjacent cards between the movable clamping member and the fixed clamping member 17. The lower edges of the clamping members 16 and 17 are spaced a distance above the fingers so that when the clamping member 16 is closed, a stack of approximately fifty cards remain beneath the bottommost card secured by the members. While the clamping member 16 is maintained in its closed position, the cam 92 during the 60° to 90° movement of the cam shaft 94 pivots the fingers 12 downwardly into a partially retracted position wherein the lower stack of fifty cards is separated from the upper stack of cards in the magazine. Approximately 20° of cam shaft rotation after the partial retraction of the fingers, the cammed surface 130 permits the spring 142 to move the joggle arm 134 inwardly aligning the cards in the lower stack against the back wall 88 of the magazine and insuring that cards are evenly stacked so that they will not catch on the sides of the lower portion of the feed magazine.

Simultaneously with the start of the operation of the joggle arm 134, the cammed surface 132 permits the spring 158 to begin rotating the shutter 18 so that it is interposed between the upper and lower stacks of cards. Just prior to 180° of rotation of the cam shaft 94, the joggle arm 134 has completed its operating cycle and has again been retracted. The inward movement of the shutter 18 has also been completed at this point, the cammed surface 132 being shaped so as to maintain the shutter interposed between the stacks while the complete retraction of the fingers 12 is taking place by the action of the cam 92 during approximately 200° to 225° movement of the cam shaft 94 to complete the drop of the partially dropped stack of cards. The fingers 12 are subsequently returned to their normal horizontal position and the shutter 18 retracted, the latter operation being completed at the 330° position whereupon the clamping member 16 is again retracted permitting the upper stack to drop until its bottom card rests upon the fingers 12. It will be noted that the various moving elements have at this point been returned to their original positions and are ready to start the next complete cycle of operation during the next revolution of the cam shaft 94.

The cam shaft 94 is driven by a gear 160 whose teeth mesh with the teeth of an idler gear 162 carried on the shaft 76 upon which the entire hopper mechanism is pivotally mounted. As is shown in Fig. 7, the idler gear 162 also mates with a gear 164 which is free to rotate with respect to a shaft 166 upon which it is supported. The gear 164 has pivotally mounted thereupon a spring loaded clutch dog 168 which is normally held in a released position against a pin 170 by a spring loaded latch bell crank 171. When the dog 168 is released, as described below, it engages the single tooth of a ratchet 173 which is secured to the shaft 166. The shaft 166, which is continuously driven by a gear train as will be explained later, has affixed thereto a cam 172 which engages a cam follower roller 174. The roller is carried upon the end of an arm 176 attached to a shaft 178 upon which is also carried a trip arm 180 and a feeler finger 182 (Figs. 5 and 6) so that the arms and finger move conjointly as the roller follows the surface of the cam 172.

The feeler finger 182 is located so that when the cam follower roller 174 enters the low portion of the surface of the cam 172 the shaft 178 is rotated clockwise (as in Fig. 7), the tab 182′ at the end of the finger is moved inwardly towards the magazine chamber immediately below the fingers 12. If the top level of the cards stacked in such chamber is above the level of the lower end of the tab 182′, the clockwise rotation of the shaft 178 is restrained and no further action results. When the level of the cards has fallen below the level of the tab 182′, the rotation of the shaft 178 is no longer restrained by the tab and the pin on the end of the trip arm 180 comes into contact with one end of the latch bell crank 171 to rotate the bell crank clockwise about a fixed pivot pin 184 so that the other end of the bell crank releases the clutch dog 168. The end of the dog 168 engages the single tooth of the ratchet 173 so that the gear 164 rotates conjointly with the shaft 166 to drive the cam shaft 94 through the gears 160 and 162. As described above, the rotation of the cam shaft 94 initiates the operation of the fingers 12 and the clamping member 16 to drop a stack of approximately fifty cards into the lower portion of the magazine. Normally an additional fifty cards will bring the level of the uppermost cards to a point where they interfere with the clockwise movement of the feeler finger 182 and the shaft 178 so that the latch bell crank 171 is free to be rotated counterclockwise by its biasing spring to bring the end of the bell crank again into engagement with the dog 168 to lift it from the ratchet 173, thus stopping the rotation of the cam shaft 94.

*The card feeding and counting mechanism*

Figure 2:
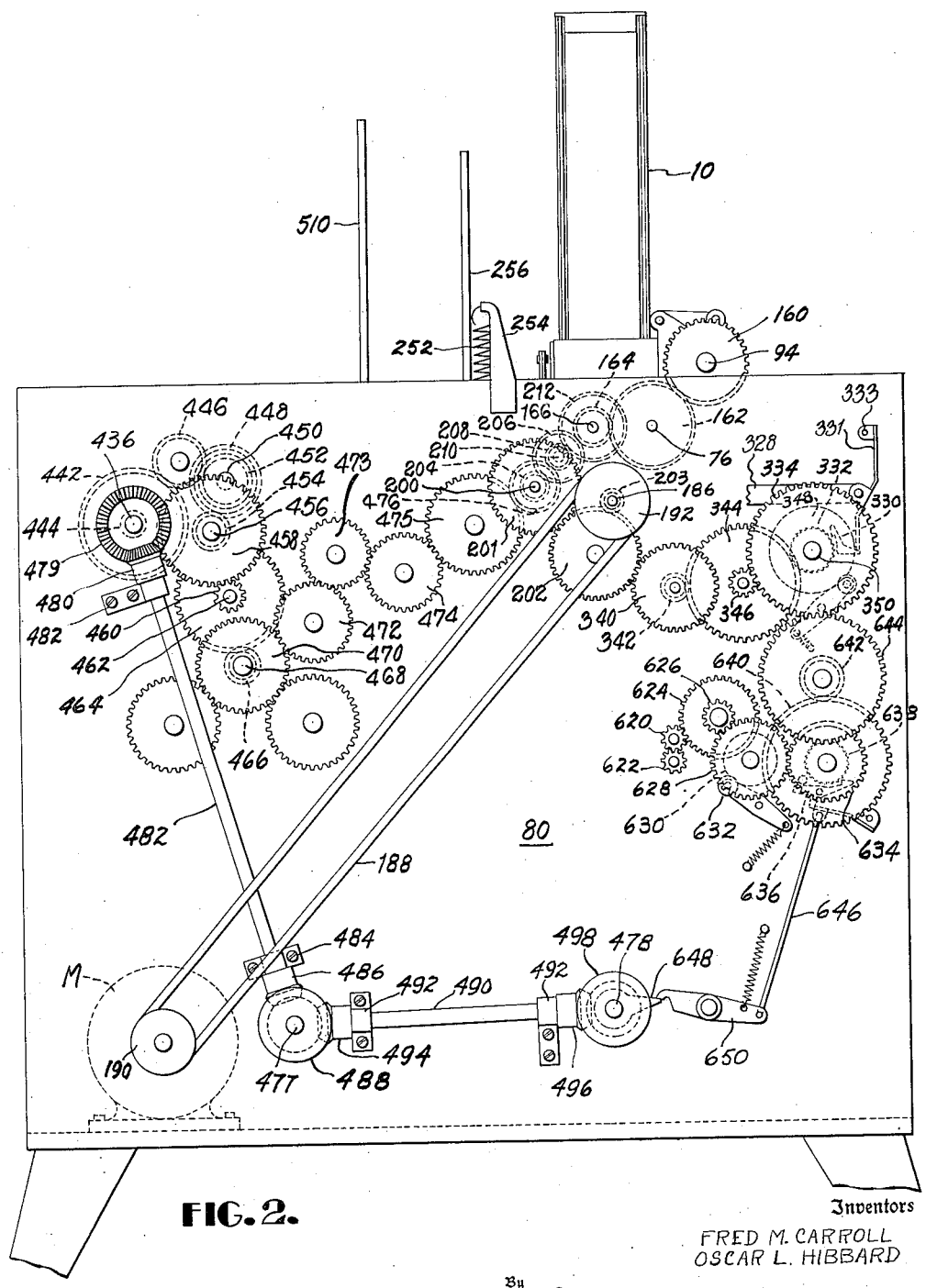
Fig. 2 is a rear view of the machine showing the interconnection of the various gear trains.

The bottommost card of the lower stack C1 in the feed hopper rests upon the counting drum 14 as has been described heretofore. The drum 14 is carried upon a shaft 186 which is driven from an electric motor M (Fig. 2) through a V-belt 188 and the sheaves 190 and 192, the shaft 186 being the main drive shaft of the machine so that the drum rotates continuously while the machine is in operation.

Extending outwardly beyond the periphery of the drum 14 by an adjustable amount are two diametrically disposed pads 194 (Fig. 8) of a friction material such as rubber, so that as the drum rotates the downwardly facing surface of the bottommost card in the lower stack is contacted by one of the pads 194. The card is ejected towards the right by the frictional contact with the pad 194 so that the card passes through the aperture between the throat knife 22 and throat block 24 so that the leading edge of the card is interposed between two feed rolls 196 and 198, which are driven in a manner that will be described in detail below. The clearance between the throat knife 22 and throat block 24 is limited so that only one card at a time can pass therethrough. As can best be seen in Figs. 3 and 5, the feed rolls 196 and 198 are driven from the same shaft 186 as the drum 14 by means of a gear train shown in Fig. 3, comprising a pinion 218 fixed to drive shaft 186 and mating with an idler gear 220 carried upon a stud shaft 204. The gear 220 mates with a pinion 221 (Fig. 5) on a shaft 223 carrying the lower feed rolls 198. The pinion 221 mates with a similar pinion 224 on a shaft 226 carrying the upper feed rolls 196 whereby the rolls rotate at the same speed in opposite directions, so that as the leading edge of the card is inserted between the rolls by the above explained action of the drum 14, the card is fed by the rolls into the stacking chamber to the right of the rolls, wherein the movement of the card is arrested by a stop plate 228 (Fig. 8) and the card drops upon the top of the stack upon the elevator platform 26.

Figure 3:
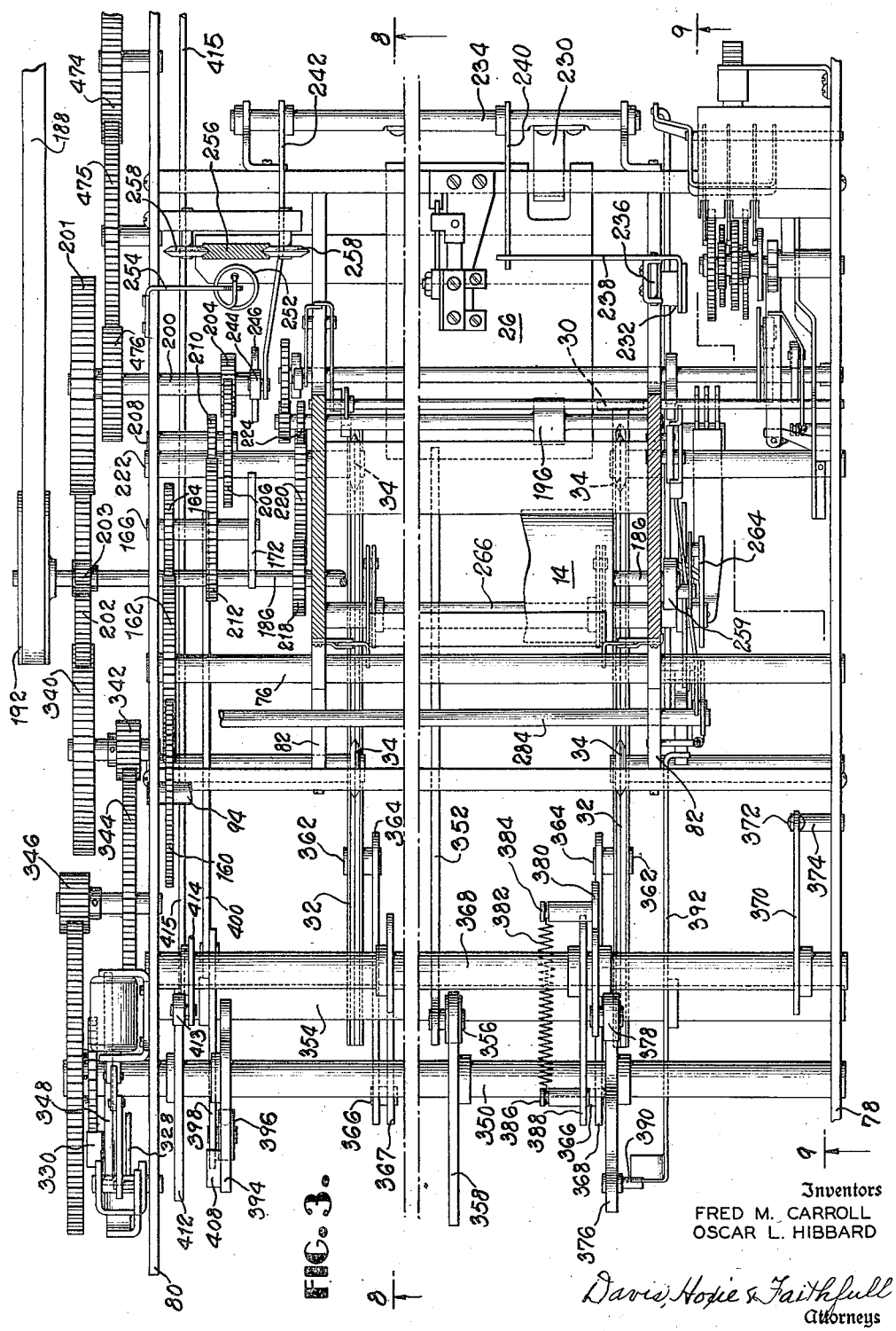
Fig. 3 is a partial plan view of the card feed and associated elements.

As the cards are being stacked upon the platform 26, they are joggled by two side fingers 230 (only one of which is shown in Fig. 3) and an end finger 232. The side fingers 230 are directly connected to a shaft 234 so that the fingers move back and forth as the shaft is oscillated. The end finger 232 is pivoted at 236 and is moved by means of a lever 238 which is contacted by an arm 240 extending from the shaft 234. An oscillating movement is imparted to the shaft 234 through a cam follower arm 242 (see also Fig. 8) having a roller 244 upon the end thereof for engaging a heart-shaped cam 246. The cam is mounted upon a shaft 200 which is continuously driven from the main drive shaft 186 by a gear train including the gear 201, which is fixed to the shaft 200, an idler gear 202, and a pinion 203 which is fixed to the drive shaft. The loading hopper mechanism clutch shaft 166 is also driven from the shaft 200 by means of a gear train including a gear 204 which mates with a gear 206 on a shaft 208. Also secured to shaft 208 is a pinion 210 which mates with a gear 212 fixed to the clutch shaft 166.

To insure that the leading edge of a card emerging from the feed rolls 196 and 198 is deposited over rather than under the trailing edge of the preceding card, a vane 248 (Fig. 8) is mounted upon a shaft 250 which is continuously rotated by a gear (not shown) mating with the bottom feed roll pinion 221 (Fig. 5) so that the vane knocks down all the trailing edges of the cards.

The elevator platform 26 is supported by a long helical spring 252 whose upper end is attached to a bracket 254 (Fig. 4) which extends from the rear frame plate 80. The platform 26 is guided by means of an elongated vertical member 256 having V-grooves on either side for engaging a pair of spaced V-wheels 258 (Fig. 3). Because of its spring suspension, the platform 26 continuously drops as more cards are added to the stack so that the top level of the cards never rises above the level of the contact point of the feed rolls 196 and 198. Also, a function of vane 248 mounted on rotating shaft 250 is to forcibly depress the card stack resting on plate 26 by acting on the top card of said stack in case of an accumulation of foreign matter impeding the action of carrier bar 256 operating on rolls 258.

The drive shaft 186 carrying the drum 14 also pivotally carries upon its front end a link 259 (Fig. 9) which pivotally connects, as at 260, to one end of a second link 262 whose other end is pivotally attached to one arm of a bell crank 264 so that the crank makes two complete cyclic movements for each revolution of the drum. The crank 264 is pivoted upon a shaft 266 so that during each cyclic movement the crank imparts a reciprocating movement to a counting finger 268 which is pivotally attached, as at 270, to the other arm of the crank. The upper end of the finger 268 is bent over and, under the action of a spring 271, engages the notches in a unit counting wheel 272 which is rotatably mounted upon a stud 274 so that the wheel is moved counterclockwise in a step-by-step action each corresponding to one of the oscillations of the bell crank 264. The unit counting wheel has twenty notches around its periphery, the "zero" notches being deeper, so that every ten steps of the unit wheel the counting finger 268 also engages the notch of a "ten" wheel (not shown) mounted on the same stud 274 behind the unit wheel. Similarly, the "zero" positions of the "ten" wheel have deep notches so that the "hundreds" wheel (also hidden) mounted on the stud 274 is moved one notch for every ten notches of movement of the "ten" wheel in the well known deep notch method. The "hundreds" wheel has two projecting pins 276 located adjacent its "zero" positions so that upon the "thousand" count the uppermost pin engages the end of a link 278.

The link 278 is pivotally suspended from a vertical arm 280 and is moved longitudinally to the left by the pin 276 to rotate an attached latch piece 282 counterclockwise about a stud 284, so that the latch piece 282 engages a detent 283.

As the link 278 is moved, a pin 286 projecting laterally from the far side thereof engages the end of a lever 288 which pivots counterclockwise about a stud 290 upon the end of a latch arm 292. The lever 288 is connected by a spring 294 with a latch 296 which is also pivoted upon the stud 290 so that the latch follows the counterclockwise movement of the lever when a pin 298 at the end of the bell crank 264 is moved out of the way by the cyclic motion of the crank. The pin 298 then contacts the end of the latch 296 to rotate the latch and latch arm 292 in a counterclockwise direction, so that the opposite end of the arm engages the latch piece 282. The latch arm 292 is fixed to the shaft 266 so that the shaft is also rotated in a counterclockwise direction, and a second arm 300 also secured thereto lifts a link 302. The upper end of the link 302 has a finger 304 which projects inwardly into the lower portion of the magazine immediately above the drum 14 so that when the "thousand" count is reached the link 302 and the finger 304 lift the trailing edge of the stack of cards in the magazine and the feeding of the cards is interrupted without stopping the rotation of the drum.

To insure that no count is made of a card which fails to feed, a card check lever 306 is supported upon a shaft 308 so that as a card passes between the feed rolls 196 and 198, the lever and shaft are rotated counterclockwise to move a latch piece 310 in the same direction into the path of an extension 312 of a cam follower arm 314 which pivots about a stud 316. When a cam follower roller 318 mounted on the arm 314 engages the high portion of a cam 320, the arm is maintained in the position illustrated against the clockwise biasing torque of a spring 322. The cam 320 is attached to the continuously rotating vane shaft 250 and, as the roller 318 engages the lower portions of the cam surface, the arm 314 is rotated clockwise by the spring. If the card lever 306 has been rotated by the passing of a card between the feed rolls 196 and 198, the movement of the arm 314 is limited by the engagement of its extension 312 with the latch piece 310 as explained above. If, however, for any reason a card fails to feed, the clockwise rotation of the arm 314 is not restrained by the latch piece 310 and a pin 324 at the lower end thereof lifts the count finger 268 so that it cannot engage the notches of the count wheel 272 and no count takes place.

The latch piece 282 is fixed to the shaft 284 so that when the above described counterclockwise rotation of the latch piece takes place, the shaft is rotated in the same direction. The shaft 284 extends back through the rear frame plate 80 and has attached to its far end an arm 326 to which is pivotally connected one end of a link 328 (Fig. 9). The other end of the link 328 (Fig. 2) moves a clutch dog latch 331 counterclockwise about its pivotal center 333 causing clutch dog 330 to engage one of the teeth on a clutch ratchet 332 directly connected with a continuously operating gear 334 which is driven from a pinion 203 (Fig. 2) upon the main drive shaft 186 through a gear train including the intermeshed gears 202, 340, 342, 344 and 346 which mates with the clutch gear 334. The clutch dog 330 is pivotally carried by a disc 348 (Fig. 3) attached to a cam shaft 350 which, for purposes of clarity, will be termed the "A" cam shaft, so that when the "thousand" count is reached the clutch is engaged and the cam shaft rotated clockwise by the above described linkages.

The "A" cam shaft 350 carries several cams described in detail below which actuate the stack pushing members 30, the leveling arm for the elevator platform 26, the paper cut off knife 44, the adhesive roll mechanism and reset for the counting mechanism. The leveling of the elevator platform 26 is accomplished by means of a long bent arm 352 which is pivotally supported upon a transverse shaft 354 so that one end of the lever rests on the top surface of the platform. The other end of the arm 352 carries a cam follower roller 356 which engages a cam 358 rotated by the "A" cam shaft 350 so that the right hand end of the arm is moved downwardly to bring the elevator platform 26 to substantially the same level as that of the second elevator platform 28.

After the platforms 26 and 28 are at substantially the same level, the stack of cards is transferred from the stacker platform 26 to the wrapping platform 28 by the transverse movement of the two vertical pusher members 30 which are spaced to pass by the sides of the stacker platform as is shown in Fig. 3. As described heretofore, the pusher members 30 are attached respectively to the ends of supporting bars 32 which have V-grooves in their top and bottom edges to engage V-wheels 34 so that the members are movable back and forth in a horizontal direction. As is best shown in Fig. 9, each of the supporting bars 32 is provided with a projecting pin 362 to which is pivotally connected one end of a link 364. The other end of each of the links 364 is pivotally connected by a pin 366 with a respective arm 367 both of which arms are attached to a shaft 368. Also attached to the shaft 368 is an arm 370 the end of which has connected thereto a helical spring 372. The other end of the spring 372 is attached to a pin 374 projecting from the front frame plate 78, as shown in Fig. 3, so that the shaft 368 is rotated clockwise to retract the pusher members 30 to the position shown in Fig. 9. The pusher members 30 are moved from this position by a cam 376 rotated by the "A" cam shaft 350 which engages a roller 378 carried upon one end of a cam follower arm 380 pivotally mounted upon the shaft 368. A helical spring 382 interconnects a pin 384 on the cam follower arm 380 with a similar pin 386 upon an arm 388 attached to the shaft 368 so that as the cam 376 rotates the cam follower arm 380 in a counterclockwise direction, the arm 388 and the shaft 368 are rotated in the same direction by the action of the spring 382 so that the arm 367 and the link 364 move the pusher members 30 to the right to transfer the stack of cards to the second platform 28. The resiliency of the spring 382 permits the use of a cam 376 with sufficient rise so that the pusher members 30 provide an overtravel for the stack.

The cam 376 also has projecting from the side thereof an adjustable pin 390, which as the cam rotates, acts through a lever 392 pivoted on the shaft 354 to release the latch piece 282 and the latch arm 292 at the completion of the cycle of the pusher member 30 so that the counting mechanism is restored to its normal position and the finger 304 lowered to permit the resuming of the ejection of cards by the counting drum 14.

Also carried upon the "A" cam shaft 350 is a cam 394 which operates the knife 44 for severing the web W. Cooperating with the cam 394 is a roller 396 carried upon one end of a bent lever 398 which pivots about the shaft 354. The other end of the lever 398 is pivotally connected to one end of an elongated link 400. The opposite end of the link is slotted to accommodate a pin 401 on the end of a bell crank 402 which carries the movable knife edge 44. The bell crank 402 pivots about a stud 404 under the action of a spring 405 (Fig. 8) to move the knife edge 44 upwardly so that the web W is severed between it and a stationary knife edge 406, the cam having a sharp drop off as at 408 which engages the end 410 of the lever 398 to give a quick cutting action. Also carried upon the "A" cam shaft 350 is a cam 412 (Fig. 8) for operating the adhesive applying mechanism 42. The follower for the cam 412 is a roller 413 carried on an arm 414 which is pivotally carried upon the shaft 368. Connected to the end of the arm 414 is a rod 415 which extends to connect with one arm of a bell crank 416 (Fig. 11) pivoted upon a shaft 418. The other arm of the bell crank 416 is pivotally attached to the end of a rack which operates adhesive roll 666 in the adhesive mechanism as will be described below.

*Wrapping mechanism*

Upon being transferred to the platform 28 where the stack rests upon the severed portion of the web W, the stack is ready for the wrapping operations. These operations are initiated by the stack itself as it contacts one end of an arm 422 (Fig. 11) at the completion of its transfer from the platform 26 as described above. The other end of the arm 422 is connected to the short shaft 418 to which is also attached a horizontal arm 424 whose extended end engages the end of a lever 426. The lever is pivoted upon a shaft 428 so that as the arm 422 is moved counterclockwise, the lever moves clockwise and the opposite end thereof unlatches a spring biased clutch dog 430. Upon being unlatched the dog 430 is rotated clockwise by its spring so that it engages one of the teeth of a ratchet 432 which is continuously driven as will be described hereinafter. The dog 430 is pivoted upon a disc 434 secured to a "B" cam shaft 436 so that as the dog engages the ratchet 432 the cam shaft is rotated in a clockwise direction. The disc 434 has an indentation which engages a roller 438 (Fig. 12) carried upon the end of a spring biased arm 440 so that the roller acts as a detent for returning the "B" cam shaft 436 to its initial or "zero" position when the dog 430 is disengaged by the returning of the feeler arm 422 to its normal position.

The drive for the ratchet 432 includes a gear 442 (Fig. 2) which is mounted on a common shaft 444 inside the back frame plate 80. The gear 442 is driven through a gear train including an idler gear 446 which intermeshes with the gear 442 and a gear 448 secured to a shaft 450. Also secured to a shaft 450 is a gear 452 which engages a mating pinion 454 secured to a shaft 456 whose end projects out through the back plate 80 to carry a gear 458. The gear 458 meshes with a pinion 460 carried upon a shaft 462 which also has attached thereto a gear 464 that is engaged by a pinion 466 secured to a shaft 468. Also secured to the shaft 468 is a gear 470 which is driven by means of a series of intermeshing idler gears 472, 473, 474 and 475, the last of which mates with a pinion 476 secured to the shaft 200 forming part of the hopper mechanism drive as described heretofore.

Two further cam shafts 477 and 478, which will be designated the "C" and "D" cam shafts for purposes of identification, are driven in synchronism with the "B" cam shaft 436 by a drive including a beveled gear 479 and mating pinion 480 which is secured to a shaft 482 journalled in bearings 484. A similar pinion 486 is carried upon the opposite end of the shaft 482 where it mates with a beveled gear 488 which is secured to the end of the "C" cam shaft 477. The "D" cam shaft 478 is driven from the beveled gear 488 through a second drive shaft 490, journalled in bearings 492 so that a pinion 494 on one end thereof mates with the beveled gear 488. The other end of the shaft 490 carried a pinion 496 which engages a beveled gear 498 secured to the end of the "D" cam shaft 478.

As can best be seen in Fig. 10, the wrapping elevator platform 28 is supported upon the top of a column 500 having V-grooves on either side for engaging V-wheels 502 so that the platform is constrained to move in a vertical direction. The weight of the elevator 28 and the stack of cards resting thereupon is counterbalanced by a weight (not shown) attached to one end of a cable 504 which passes over a sheave 506 rotatably mounted on a stud 507 extending from the side of the crossbar 509. The other end of the cable 504 is secured to a stud 508 extending from the side of the column 500 near the bottom thereof.

The ram 48 is also constrained to move in a vertical direction by a column 510 (Fig. 11) having V-grooves in its opposed edges for engaging V-shaped wheels 512 (Fig. 4). The ram 48 is moved downwardly by an arm 516 (Fig. 11) which carries a roll 514 acting upon the ram so that the ram head 46 contacts the top of the stack of cards upon the platform to move both the cards and platform downwardly against the counterbalancing force exerted by the weight. The ram arm 516 is secured to a rotatable shaft 518 and has formed integrally therewith a shorter arm 520 at the end of which is mounted a cam follower roller 522. The roller 522 engages the effective surface of a cam 524 which is attached to the "B" cam shaft 436, so that the ram 48 is positively driven in both directions.

After the stack and platform 28 have been lowered by the ram 48, they are maintained in the lower position, as the ram 48 is retracted, by a latch lever 532 (Fig. 10) which is pivotally mounted at 534 so as to engage the teeth of a rack 536 attached to the platform column 500. The latch lever 532 is operated by a cam 538 secured to the "C" cam shaft 477 so as to engage a cam follower roller 540 carried upon the opposite end of the latch lever.

It will be evident that as the stack descends under the force exerted by the ram 48, as described heretofore, the pusher member 30 and the side of the preceding stack which is resting upon the eject platform 74 will act as guides so that the web W of wrapping material interposed between the descending stack and the elevator platform 28 will be folded against the opposed vertical sides of the stack. The upper end of the portion of the web adjacent the left side of the stack (as viewed in Fig. 10) is folded down against the top of the stack by a roller 50 the ends of which are journalled in the upper end of two spaced articulated arms 52 secured at their lower ends to a shaft 542. The arms 52 are each pivotally joined as at 544, and the upper and lower portions joined by a spring 546 which limits the force that can be applied to the top of the stack by the roller 50. The shaft 542 also has secured thereto a cam follower arm 548 upon the end of which is carried a roller 550 for engaging a cam 552 rotated by the "D" cam shaft 478 so that the arms 52 are pivoted against the restoring force of a spring 554 to bring the roller 50 into contact with the top of the stack.

The upper portion of the web adjacent the right hand side of the stack is folded inwardly over the top of the stack to form an open ended tube of wrapping material about the stack by means of a second roller 54. The roller 54 is journalled upon the upper ends of two articulated arms 56 which are very similar in construction to the arms 52 described in detail above. The arms 56 are secured to a shaft 556 which also carries a cam following arm having a roller 558 for engaging a cam 560. The cam 560 is rotated by the "C" cam shaft 477 to move the roller 54 in over the top of the stack to fold the right hand end portion of the web over the previously folded left hand portion. The inner surface of the right hand end portion of the web has had adhesive applied thereto previously by the mechanism 42, as will be described in detail below, so that the web ends are held in their overlapped position to form the open ended tube around the stack.

The ends of the tube are closed by first folding the bottom portions of the tube which extend beyond the opposed ends of the stack by means of two spaced folding members 58 each of which is mounted upon the end of a respective arm 60. The arms 60 are both secured to a shaft 562, so as the shaft is rotated counterclockwise, the folding members 58 are conjointly raised to a position parallel to the ends of the stack and spaced a short distance therefrom thereby to fold the bottom end portions of the web upwardly against the ends of the stack. The shaft 562 is rotated counterclockwise to raise the folding members 58 by means of a roller 564 which is mounted on one of the arms 60 to engage a push up cam 566 rotated by the "D" cam shaft 478. The shaft 562 is rotated clockwise to retract the folding members 58 by means of an attached arm 568 carrying a roller 570 which engages a complementary pull down cam 572 also rotated by the "D" cam shaft 478 so that the folding members are positively driven in both directions. The end portions of the web at the top of the stack are folded inwardly against the ends of the stack in an analogous manner by two upper folding members 62 which are pivotally attached to the ram head 46 so that as the ram 48 is brought down for a partial stroke, the members fold down the top end portions of the web against the sides of the stack in an action similar to that of the upward folding members 58 described above.

After the top and bottom portions of the tube web have been folded in as described above they are maintained in this position by folders 58 and 62. Two side flaps extend outwardly from each side of each end of the stack. The left hand flaps (as viewed in Fig. 10) on the near and far ends of the stack are folded in by two spaced side folding members 64 each of which is attached to the forward end of a respective supporting bar 70 movably carried by wheels 72 that engage grooves in the top and bottom of the bars. Each of the bars 70 and its side folding member 64 is moved towards the right against the force exerted by a spring 580 by a linkage which includes a cam following arm 582 and a link 584 whose ends are pivotally connected to the arm and supporting bar, respectively. The arms 582 are both attached to a shaft 586 which is rotated clockwise as a roller 588 mounted upon one of the arms engages a cam 590 rotated by the "D" cam shaft 478.

Before the right hand flaps are folded inwardly, the wrapping platform 28 is raised to the level of the stationary eject platform 74 under the control of an arm 592 having a roller 594 on its end for engaging an angle bracket 596 attached to the platform column 500. The other end of the leveling arm 592 is pivotally carried by a shaft 598. The arm 592 is moved downwardly by a cam 600 which is rotated by the "D" cam shaft 478 to engage a cam follower roller 602 pivotally mounted at an intermediate point on the arm.

After the wrapping platform 28 has been leveled as described above, the stack is transferred to the ejecting platform 74 by two spaced pusher members 68. Each of the members 68 is caried upon the end of a respective supporting bar 604 having grooves in their upper and lower edges to engage wheels (not shown) which are similar to and rotatably mounted upon the same axles as the wheels 72. The movement of the pusher members is obtained from two arms 606 which are attached to a common shaft 598, each of the arms being pivotally interconnected with its associated supporting bar 70 by means of a link 608. The arms 606 are moved clockwise to actuate the pusher members 68 by a cam follower roller 610 which engages a cam 612 thereby to transfer the stack. The return movement of the pusher members 68 is accomplished by means of a spring 614 connected to one of the arms 606. As the stack is moved by the pusher members 68, it passes between two vertical rollers 66 which force the right hand side flaps of the stack down against the previously folded left hand flaps to complete the wrapping cycle. The vertical rollers 66 are spaced horizontally from the edge of the wrapping platform 28 so that, when the stroke of the pusher members 68 has been completed, the wrapped stack is interposed between the rollers with its flaps securely held down against the ends of the stack. It will be noted that as pusher 68 moves the stack from its location on platform 28 to platform 74, left hand side folding members 64 follow the motion of the stack to support the previously formed left hand fold until the right hand folds can take over this duty. The wrapped stack remains between the vertical rollers 66 until the succeeding stack is wrapped and pushes the first stack out of the way, thereby permitting the adhesive on the flaps to set before the pressure exerted by the rolls is removed.

After the wrapped stack is transferred to the ejecting platform 74, it is necessary to feed another portion of the web W so that it lies on top of the wrapping platform 28. The web is unwound from a supply roll (not shown) by two feed rolls 36 (Figs. 9 and 10) whose shafts are rotated by intermeshing pinions 620 and 622 (Fig. 2) which are driven by a gear train including a gear 624 mounted upon the same shaft as a pinion 626 which mates with an idler gear 628. The shaft upon which the gear 628 is attached has mounted thereupon a circular cam 630 having an indentation for engaging a spring loaded roller 632 which acts as a detent for locking the feed rolls 36 after the feeding operation is completed. The gear 628 also engages a gear 634 having a dog 636 pivotally attached thereto. When tripped as described in detail below, the dog 636 engages a rachet 638 which is continuously driven by an attached gear 640 through a gear train including a pinion 642 which is secured to a shaft also carrying a gear 644 meshing with the gear 334. The dog 636 is tripped by a rod 646 which is moved through a lever 650 by a cam 648 rotated by the "D" cam shaft 478, so that the gear 638 makes one revolution before the dog disengages so that the gears 620 and 622 rotate the feed rolls 36 to feed the required amount of wrapping material to wrap one stack.

As the web is fed by the rolls 36, the leading edge thereof is guided by the web guide 38 to a point at one side of the gap which is occupied by the wrapping platform 28 in its raised position, then across this gap by way of folding guides to be described presently, and through the second paper guide 40. As the web passes through the guide 40, it is contacted in three positions, one across the leading edge and one along each side edge, by the applicators 652 and 654 (Fig. 11) of an adhesive roll 42 which is driven by a pinion 654 that mates with a segmental rack 656. The rack 656 is pivoted about a shaft 658 by a cam follower roller 660 which engages a cam 662 rotated by the "B" cam shaft 436. Adhesive is applied to the applicators 652 and 654 from a reservoir 664 by means of an auxiliary roll 666 which is driven by the rack 420 whose teeth engage the teeth of a gear 668 secured to the auxiliary roll.

The folding guides for bridging the gap between the stationary guides 38—40 are shown in Figs. 16-19. They comprise a pair of upper guides 700 and a pair of lower guides 702, there being one upper and one lower guide at each side of the wrapping paper W. The upper guides 700 are pivoted on shafts 704 extending transversely of the frame sides 78—80; and the lower guides 702 are pivoted on longitudinal shafts 706 mounted on the respective sides of the frame. Both the upper and the lower guides are operated by two arms 708 rigidly fastened to a transverse shaft 710 and located adjacent the respective frame sides 78—80. Motion to one of the arms 708 is derived from a cam 712 on shaft 478, through roller follower 714 and pitman 716, there being a spring 718 which holds the follower 714 against cam 712. Motion from one arm 708 to the other is transmitted through shaft 710.

The free end of each arm 708 curves downward into engagement with one of the lower guides 702 (Fig. 16). Lowering of the pitman 716 by cam 712 causes each arm 708 to swing the underlying lower guide 702 downward on its pivot 706 until it occupies a substantially vertical inoperative position adjacent the wall 78 or 80 (Fig. 17), in which position it no longer overlies the wrapping platform 28. Upon raising of the pitman 716 and arms 708, the lower guides 702 are returned to their operating positions by springs 702a coiled around the respective shafts 706. Each arm 708 has intermediate its ends a transverse pin 720 engaged in a slot 700a in an extension 700b of the adjacent upper guide 700. Thus, downward movement of each arm 708 depresses the extension 700b and thereby raises the adjacent upper guide 700 about its pivot 704 (as indicated by the broken lines in Fig. 18) until the upper guides no longer overlie the wrapping platform 28. Upon upward movement of arms 708, the upper guides 700 are lowered about their pivots 704 to their operating positions (Fig. 18).

In their operating positions, the upper and lower guides 700—702 serve to guide the wrapping paper W as it passes between these guides from the stationary guide 38 to the stationary guide 40, and to prevent curling of the paper. Once the paper has been fed into the stationary guide 40, the cam 712 lowers the arms 708 and thereby moves the guides 700—702 to their inoperative positions, so that platform 28 can be raised to its loading position for another wrapping cycle. The cam 712 returns the guides 700—702 to their operating positions at about the time when cam 648 (Fig. 2) causes the paper feed rolls 36 to start their rotation. It will be observed that the cam 712 constitutes a means synchronized with the operation of the platform 28 and operable to advance and retract the guides 700—702 to and from their operative positions. Thus, the guides are moved to their operating positions to guide the web W from the feed rolls 36 after full retraction of ram 48 and before return of platform 28 to its loading position.

*Electrical system*

The motor M is energized from terminals t1 and t2 of a conventional alternating power source (not shown) through line switch S1, a fuse F and the normally open contacts S2 of a relay R1. The contacts S2 are closed by energizing of the relay coil through the normally open contacts S3 of an auxiliary relay R3. The coil of the auxiliary relay R3 is initially energized by a direct current which flows upon the closing of a momentary contact push buttom S4 through a circuit which includes the terminal t1, the switch S1, the fuse F, a resistor r, a rectifier X, the push button, and the coil of the relay R3 to the terminal t2.

After the motor M has been started, the relay R3 is maintained energized by a holding circuit which is in parallel with the start push button S4. This holding circuit includes a pair of normally open holding contacts S5 of the auxiliary relay R3, a stop button S6 whose contacts are normally closed, and four pair of interlocking contacts S7, S8, S9 and S10, all of which are in the closed position when the machine is operating normally, as will be described below.

The contacts S7, which are normally open, are closed by an arm 680 (Fig. 4) which is contacted by the cards in the hopper 10. When the hopper 10 is empty, the arm 680 is not pivoted and the contacts S7 open to stop the machine.

The normally open contacts S7 are closed by a card feeler finger 306 (Fig. 9) each time a card passes through the throat blocks. Connected in parallel with the contacts S7 is a series connected capacitor Ca and resistor rc with a time constant such that they can supply energy to maintain the relay R3 held in for the period required to feed five cards, so that if less than five cards fail to feed sequentially, the motor M is not stopped even though the contacts S7 fail to close. However, the failure of the contacts S7 to close some time during the period required to feed five cards will result in the shutting down of the machine.

The normally closed contacts S8 are opened by an arm located near the top of the stacker above the platform 26 which is tripped if the cards pile up indicating that there is a jam in the stacker.

Figure 12:
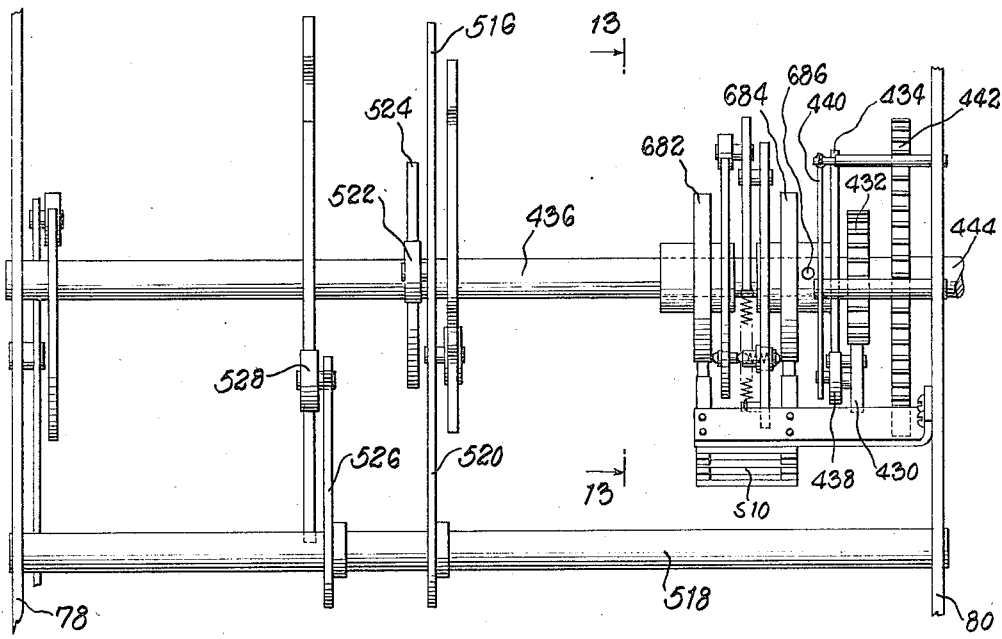
Fig. 12 is an elevational view of the cam shaft and overload clutch.
Figure 13:
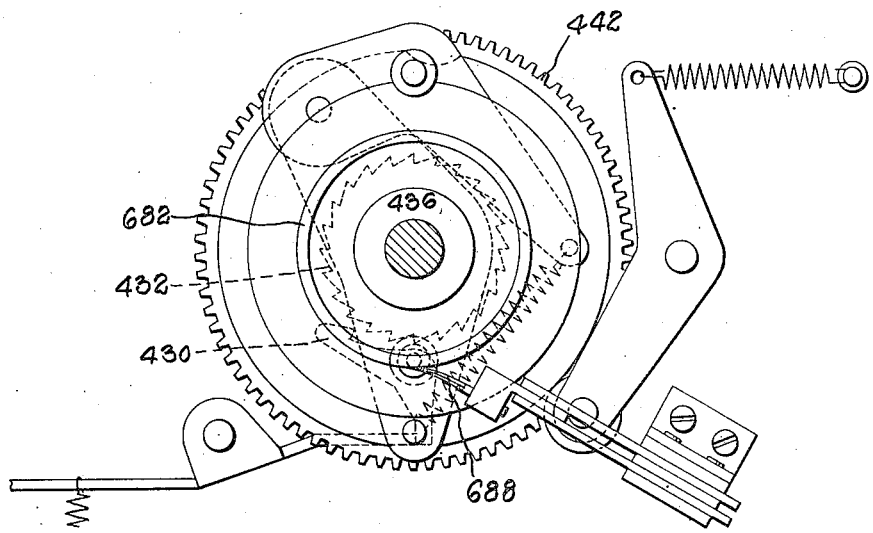
Fig. 13 is a fragmentary sectional view on the line 13—13 of Fig. 12.
Figure 14:
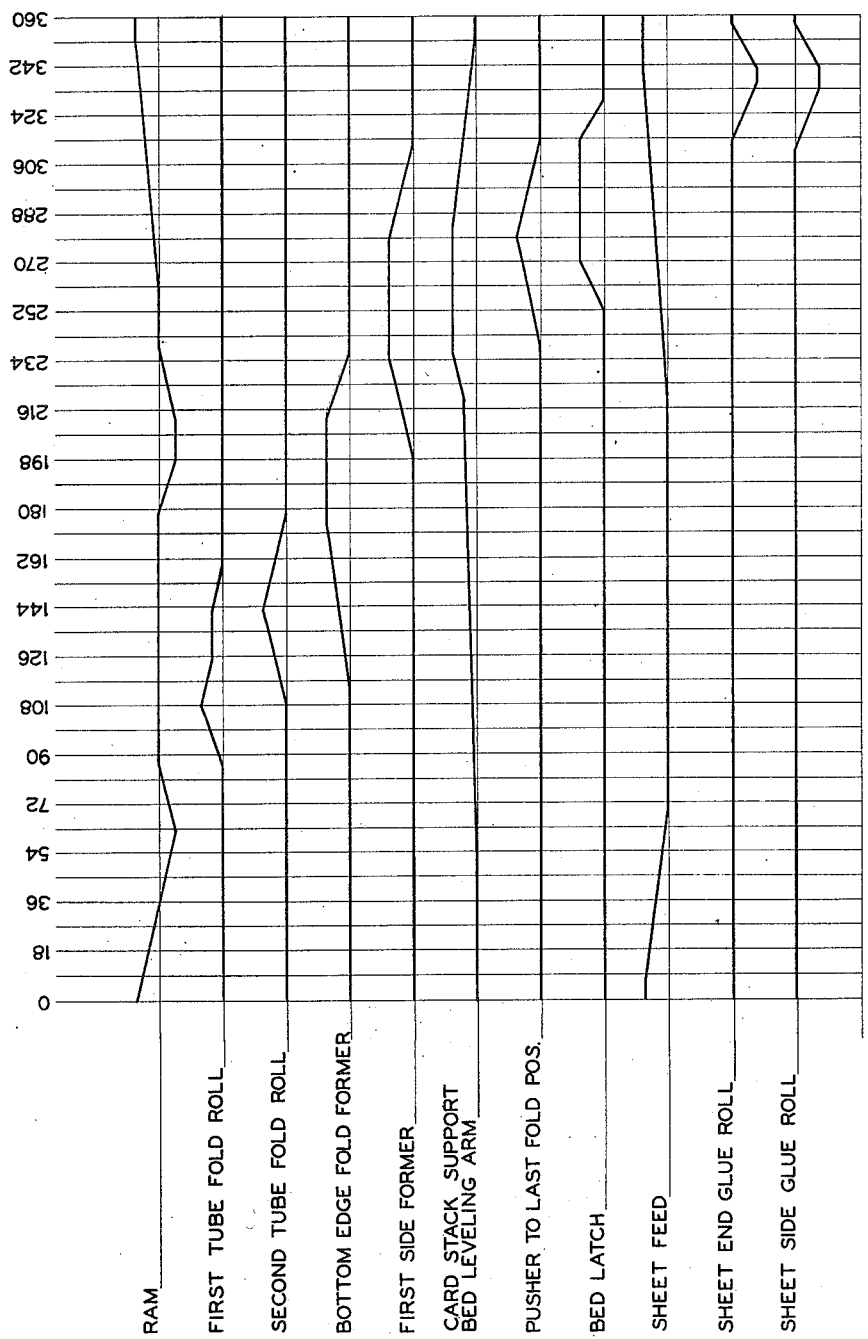
Fig. 14 is a cam timing diagram.

The shear contact S10 is opened if a jam occurs and the "B" cam shaft clutch dog has been engaged. As is shown in Figs. 11 and 12, as long as the shaft 444 moves with gear, clutch B and cam 434 by virtue of shear pin 686, shear contact rings 682 and 684 close a circuit between brushes 688. If any resistance is offered to the rotation of shaft 444, shear pin 686 will shear and contact between rings 682 and 684 will be broken to stop the machine.

Preparatory switch S11 is introduced so that cards may be run until the counter reaches one thousand at which time the machine will stop. This is necessary in case the counter has been moved from its zero count position or to insure correct count after the machine has been left unattended and may have been operated by unauthorized personnel. When the preparatory switch is in its closed position (run), the carry over contacts S13 and S12 are in parallel with the card lever contact 58 and keep the machine running while the intermediate cycle takes place.

When, on the thousandth card, latches for the piece 282 and the arm 292 (Fig. 9) are tripped and lever 392 pivots counterclockwise, carry-over contact S13 will close. This keeps the machine running even though card lever contact is not closed. As cam shaft "A" starts, carry-over contact S12 also closes and carry-over contacts S13 and S12 are now in parallel. When pin 390 engages lever 392, near the end of the intermediate cycle and relatches the latches for the piece 282 and the arm 292, carry-over contact S13 will be open. The short interval which elapsed before the card lever closes is bridged by carry-over contact S12.

We claim:

1. Apparatus for counting and wrapping cards or like articles comprising hopper means for holding a supply of cards, counting means for ejecting the cards from the hopper one by one and arranging them in a stack upon a web of wrapping material, means for forcing the stack downwardly relative to the ends of the web so as to wrap the web around the bottom and two opposed sides of the stack, means for lapping the ends of the web over the top of the stack to form an open ended tube of wrapping material about the stack, folding means for tucking in against the ends of the stack the portions of the tube which extend beyond the stack ends, and means for applying an adhesive to the areas of the surface of the tube which are formed into the outermost flaps by the folding means thereby to secure the flaps in their folded position.

2. Apparatus for counting and wrapping cards or like articles according to claim 1 wherein the means for overlapping the ends of the web over the top of the stack to form the tube of wrapping material includes two rollers disposed upon opposite sides of the stack, two pairs of arms at the ends of each of which pair is journalled a respective roller, rotatable means to which are secured the other ends of both arms of a respective pair so that either of the corresponding rollers can be moved inwardly from their respective rest positions on the opposite sides of the stack into contact with the top thereof, and cam operated means for operating the rotatable means so that the rollers first fold one web end and then the other web end into overlapping relationship at the top of the stack.

3. Apparatus for counting and wrapping cards or like articles according to claim 2 wherein each of the arms is articulated and a spring is provided to maintain the operative alignment of the articulated arm portions so that the force required to deform the spring is the maximum force which can be applied by the associated roller.

4. Apparatus for counting and wrapping cards or like articles according to claim 1 wherein is provided an elevator platform whereupon the cards are stacked as they are successively ejected from the hopper means, the platform being supported to descend under the weight of the cards, and means operative after a predetermined number of cards have been stacked to displace the stack sideways into position for wrapping.

5. Apparatus for counting and wrapping cards or like articles according to claim 4 wherein a spring is provided as the support for the platform.

6. Apparatus for counting and wrapping cards or like articles according to claim 2 wherein the means for forcing the stack downwardly includes a ram for engaging the top of the stack.

7. Apparatus for counting and wrapping cards or like articles according to claim 4 wherein the folding means include mechanism for first folding the top and bottom portions of the tube of wrapping material which extend beyond the ends of the stack inwardly towards each other and against the stack ends, the folding means also including mechanism for subsequently folding the side flap portions of the tube which extend beyond the ends of the stack inwardly towards each other to overlap against the previously folded top and bottom portions of the web.

8. Apparatus for counting and wrapping cards or like articles according to claim 6 wherein the ram is provided with extending upper folding members on either end thereof for making the fold inwardly of the top portion of the tube of wrapping material which extends beyond the ends of the stack, there being further provided two spaced lower folding members for making the first fold inwardly of the bottom portion of the tube which extends beyond the ends of the stack, and cam operated means for simultaneously moving the lower fold members so that they pass by either end of the stack adjacent the ends thereof.

9. Apparatus for counting and wrapping cards or like articles according to claim 6 wherein the folding means includes two spaced side folding members, cam means for moving the members past the ends of the stack thereby to fold inwardly the flap portions of the web on the side of the stack adjacent the members which extend beyond the ends of the stack, means for moving the stack laterally in the direction of movement of the side folding members subsequent to the completion of their folding operation, and two spaced rollers positioned to engage the opposite ends of the stack as it is moved laterally thereby to fold inwardly the flap portions of the web on the second side of the stack which extend beyond the ends of the stack.

10. Apparatus for counting and wrapping cards or like articles according to claim 5 wherein is provided a second platform whereupon the stack rests after it has been displaced sideways, the second platform being supported to descend under the force exerted upon the top of the stack by the ram, and detent means for securing the platform at the lowered position as the ram is retracted thereby to permit overlapping of the web at the top of the stack.

11. Apparatus for counting and wrapping cards or like articles according to claim 10 wherein a counterweight is provided for supporting the platform.

12. Apparatus for counting and wrapping cards or like articles according to claim 1 wherein the counting means includes a card feeding drum located at the bottom of the hopper means and a pair of throat blocks positioned adjacent the drum, the blocks being spaced apart to form an elongated aperture which is parallel to the axis of the drum whereby rotation of the drum successively ejects the cards one by one through the aperture between the blocks.

13. Apparatus for counting and wrapping cards or like articles according to claim 12 wherein the drum has two opposed friction pads which are diametrically inserted in the drum periphery to engage and eject the lowermost card in the hopper means.

14. Apparatus for counting and wrapping cards or like articles according to claim 13 wherein the friction pads are adjustable relative to the drum.

15. Apparatus for counting and wrapping cards or like articles according to claim 12 wherein means are provided for supporting the uppermost cards in the hopper means so that only a selected number of bottommost cards are supported on top of the drum.

16. Apparatus for counting and wrapping cards or like articles according to claim 15 wherein the supporting means includes spaced fingers which engage the opposed ends of the lowest card of the uppermost cards, cam means for pivotally retracting the fingers so that the lowermost cards drop down into the bottom portion of the hopper means above the drum.

17. Apparatus for counting and wrapping cards or like articles according to claim 16 wherein are further provided two opposed clamping members operated by the cam means to engage the side edges of the cards located a predetermined distance above the finger to limit the number of cards which are dropped down into the lower portion of the hopper means by the retraction of the fingers.

18. Apparatus for counting and wrapping cards or like articles according to claim 17 wherein is further provided a shutter which is interposed in the stack of cards by the cam means to assist the clamping members in holding the uppermost cards as the lowermost cards are dropped down by the retraction of the fingers.

19. Apparatus for counting and wrapping cards or like articles according to claim 18 wherein the cam means include mechanism operative partially to retract the fingers subsequent to the engagement of the cards by clamping members, the fingers being maintained in their partially retracted position to support the lowermost cards until the shutter has been interposed between the uppermost and lowermost cards whereupon the cam means fully retracts the fingers to drop the lowermost cards.

20. Apparatus for counting and wrapping cards or like articles according to claim 19 wherein feeler means are provided to initiate the operation of the cam means when the number of cards in the lower portion of the hopper means becomes less than a predetermined number.

21. Apparatus according to claim 1, comprising also a platform for supporting the stack upon the web and mounted to descend under the force exerted upon the top of the stack by said forcing means, detent means for securing the platform at the lowered position as said forcing means are retracted, and means for feeding a web of wrapping material between the platform and said forcing means.

22. Apparatus according to claim 1, comprising also a platform for supporting the stack upon the web and mounted to descend under the force exerted upon the top of the stack by said forcing means, detent means for securing the platform at the lowered position as said forcing means are retracted, means for feeding a web of wrapping material between the platform and said forcing means, movable guides for guiding the web from said feeding means and having operating positions in which they are interposed between the platform and forcing means, and means for retracting said guides from their operating positions between the platform and forcing means.

23. Apparatus according to claim 1, comprising also a platform for supporting the stack upon the web and mounted to descend under the force exerted upon the top of the stack by said forcing means, detent means for securing the platform at the lowered position as said forcing means are retracted, means for feeding a web of wrapping material between the platform and said forcing means, movable upper and lower guides for guiding the web from said feeding means and having operating positions for receiving the web between the platform and said forcing means, and means synchronized with the operation of the platform for moving the guides to and from their operating positions.

References Cited in the file of this patent

UNITED STATES PATENTS

| | | |
|---|---|---|
| 1,113,423 | Felmlee | Oct. 13, 1914 |
| 1,291,455 | Feldman | Jan. 14, 1919 |

FOREIGN PATENTS

| | | |
|---|---|---|
| 127,495 | Austria | Mar. 25, 1932 |